US012202004B2

(12) United States Patent
Ross et al.

(10) Patent No.: US 12,202,004 B2
(45) Date of Patent: Jan. 21, 2025

(54) LINER MACHINE FOR APPLYING SEALING COMPOUND

(71) Applicant: CUSTOM MACHINING CORP., Englewood, CO (US)

(72) Inventors: Allan Ross, Englewood, CO (US); Frank Buck, Englewood, CO (US)

(73) Assignee: CUSTOM MACHINING CORP., Englewood, CO (US)

( * ) Notice: Subject to any disclaimer, the term of this patent is extended or adjusted under 35 U.S.C. 154(b) by 0 days.

(21) Appl. No.: 18/296,764

(22) Filed: Apr. 6, 2023

(65) Prior Publication Data

US 2023/0241640 A1 Aug. 3, 2023

Related U.S. Application Data

(63) Continuation of application No. 17/535,882, filed on Nov. 26, 2021, now Pat. No. 11,707,761.

(60) Provisional application No. 63/148,063, filed on Feb. 10, 2021, provisional application No. 63/118,851, filed on Nov. 27, 2020.

(51) Int. Cl.
*B05C 5/02* (2006.01)
*B05C 13/02* (2006.01)

(52) U.S. Cl.
CPC .............. *B05C 5/022* (2013.01); *B05C 13/02* (2013.01); *B05C 13/025* (2013.01); *B05C* *5/027* (2013.01)

(58) Field of Classification Search
USPC .......................................................... 118/319
See application file for complete search history.

(56) References Cited

U.S. PATENT DOCUMENTS

| | | | |
|---|---|---|---|
| 2,103,270 A | 12/1937 | Murch | |
| 2,314,515 A | 3/1943 | Pearson | |
| 3,357,396 A * | 12/1967 | Melind | F16H 27/00 118/313 |
| 4,154,194 A | 5/1979 | Endlich et al. | |
| 4,249,476 A | 2/1981 | Frei et al. | |

(Continued)

FOREIGN PATENT DOCUMENTS

GB 2042373 A 9/1980

OTHER PUBLICATIONS

International Search Report and Written Opinion of the International Searching Authority, issued in connection with Int'l Appl. No. PCT/US2021/060898, dated Mar. 29, 2022 (10 pages).

*Primary Examiner* — Jethro M. Pence
(74) *Attorney, Agent, or Firm* — Holland & Hart LLP

(57) ABSTRACT

A liner machine for applying a sealing compound to a can end or lid. The liner machine includes a motor drive dual turret system. The turret system is installed at the top of a table or platform surface and two turrets rotate in opposition directions from one another, simultaneously or independently at same or different times. Each turret includes a plurality of workstations which extend out from each turret facing away from each other. The workstations receive an individual lid, which is delivered via a starwheel from a downstacker to each turret system. Each rotates in a direction that is opposite the direction that its respective turret system rotates, and in a direction that is opposite the direction that the other starwheel rotates. Sealant injectors in the turret systems apply sealant to each lid as the lids rotate around each turret system.

8 Claims, 23 Drawing Sheets

(56) References Cited

U.S. PATENT DOCUMENTS

| | | | |
|---|---|---|---|
| 4,259,372 | A | 3/1981 | Eddy |
| 4,262,629 | A | 4/1981 | McConnellogue et al. |
| 4,308,818 | A | 1/1982 | Abe et al. |
| 4,382,422 | A | 5/1983 | Eddy et al. |
| 4,418,644 | A | 12/1983 | Young |
| 4,491,613 | A | 1/1985 | Hahn |
| 4,605,351 | A | 8/1986 | Hatcher et al. |
| 5,206,054 | A | 4/1993 | Schultz |
| 5,564,877 | A | 10/1996 | Hamilton |
| 5,766,359 | A | 6/1998 | Sichmann et al. |
| 6,391,387 | B1 | 5/2002 | Rutledge et al. |
| 8,826,850 | B2 | 9/2014 | Zumberger et al. |
| 9,475,091 | B2 | 10/2016 | Zumberger et al. |
| 9,630,210 | B2 | 4/2017 | Zumberger et al. |
| 10,076,828 | B2 | 9/2018 | Ross et al. |
| 2002/0048633 | A1 | 4/2002 | Rutledge et al. |
| 2010/0209604 | A1 | 8/2010 | Stammen |
| 2013/0287950 | A1 | 10/2013 | Zumberger et al. |
| 2014/0338595 | A1 | 11/2014 | Zumberger et al. |
| 2016/0325308 | A1 | 11/2016 | Zumberger et al. |
| 2018/0200868 | A1 | 7/2018 | Ross et al. |
| 2020/0206767 | A1 | 7/2020 | Kusubashi et al. |
| 2022/0241802 | A1 | 8/2022 | Zumberger et al. |

* cited by examiner

LINER MACHINE FOR APPLYING SEALING COMPOUND

CROSS-REFERENCE TO RELATED APPLICATION

This application is a U.S. Non-Provisional Application claiming the benefit of and priority to U.S. patent application Ser. No. 17/535,882, filed Nov. 26, 2021, entitled LINER MACHINE FOR APPLYING SEALING COMPOUND, which claims the benefit of and priority to U.S. Provisional Application No. 63/148,063, filed Feb. 10, 2021, entitled LINER MACHINE FOR APPLYING SEALING COMPOUND, and U.S. Provisional Application No. 63/118,851, filed Nov. 27, 2020, entitled LINER MACHINE FOR APPLYING SEALING COMPOUND, the disclosures of which are incorporated herein by reference in their entirety.

FIELD OF TECHNOLOGY

The present disclosure relates generally to a liner machine for applying a sealing compound to an article, and more particularly, to such a machine for applying a sealing compound to a can end.

BACKGROUND

Compound end liner machines are used in can production systems. In some examples, liner machines are engineered to run beer and beverage ends, sanitary ends, and twist-off closures. Liner machines apply sealant to the underside of a can end to facilitate sealing attachment of the can end to a can container. When the can end is attached to the upper flange of the can, the applied sealant seals the can rim and the can end to close and seal the can.

Liner machines may include a turret which rotates on a vertical spindle and has a number of workstations spaced around the spindle. Each workstation may each be adapted to support a can end. Mounted at each workstation may be an injector nozzle of an applicator (or sealant dispensing gun) connected to a supply manifold fixed to the top of the turret. A supply source provides sealing compound to the supply manifold, which then feeds the sealing compound to the applicator. The injector nozzle applies the sealing compound to a can end. Liner machines may be equipped with applicators for applying water-base, solvent-base, or plastisol compounds, by way of example.

A can end is generally supported by a chuck member, driven by a chuck drive, which locates the can end adjacent the applicator in the desired position. The can end is then rotated at a high speed by the chuck member while the applicator or sealant dispensing gun valve is opened, thus resulting in an accurate, even application of liquid sealant onto the underside of the can end. After application, the liquid sealant cures to form a solidified ring of resilient sealing material.

Can ends may be fed into each workstation on one side of a turret and discharge at an exit chute located approximately 180° from the feed position. After a workstation passes the exit chute, a mechanical brush mechanism wipes against the injector nozzle in an attempt to clean any excess sealing compound from the surface of the injector nozzle. In some cases, the brush mechanism fails to adequately clean the injector nozzle. The injector nozzle may become dirty and gummed up, and as a result, require frequent replacement, thereby causing substantial downtime for the liner machine.

Finally, at least some compound end liner machines may be large, bulky machines that are difficult to maintain. For example, at least some compound end liner machines may include a table or platform surface and the rest of the equipment may be positioned in the middle of the table or platform surface. The table or platform surface may be large to accommodate the size of the axillary systems and the drive system such that the equipment on the table or platform surface is difficult to access for maintenance.

SUMMARY

The described technology includes methods, systems, devices, and apparatuses that support liner machines for applying a sealing compound to an article. Generally, the described technology provides for high performance, scalable turret liner machines for applying sealing compound to can ends, where the turrets and their respective starwheels move in synchronized timing, each turret moving in opposite directions from each other, in opposite directions from their respective starwheel.

In some implementations, the disclosed liner machines require components specifically manufactured for the direction of rotation of each component part. For example, some of the components in a first turret system may require left-handed threads, whereas the complementary components in a second turret system rotating in the opposition direction may require right-handed threads. Other customized components are contemplated as each turret system in the liner machine mirrors the other turret system.

In some implementations, a synchronized turret system includes a first turret and its respective starwheel operating simultaneously with the second turret and its respective starwheel. In other implementations, independent turret systems are configured where the first turret and its respective starwheel operate independently from the second turret. For example, the first turret and its respective starwheel may be operating while the second turret and its respective starwheel do not operate. This independent operation allows for access, downtime, and maintenance to one of the turrets and its respective system. In another example, the first turret and its respective starwheel may be operating while the second turret and its respective starwheel operate, yet each turret has the capability of operating or not operating when the other turret is operating.

In some implementations, the disclosed technology includes a sealant liner apparatus which has two motor driven turret systems, each turret system driven in a direction that is opposite the direction that the other turret system is driven. Each turret system may have a plurality of workstations spaced apart, extending outwardly from a circumference thereof, and adapted for receiving an individual can end, at least one sealant applicator electronically controlled to apply a sealant on at least one individual can end, and two belt or gear driven downstackers, each downstacker including a respective starwheel, and each starwheel driven in a direction opposite to the direction that its respective turret system is driven. The first starwheel may rotate in a direction opposite to the second starwheel.

In some implementations, the downstackers are positioned in the corners of the liner machine system on the same side of the system as the exit chutes. For example, each downstacker may be located approximately ±45° from a center axis of each starwheel. Compared to that, in other liner machine systems, can ends may be fed from a downstacker into each workstation on one side of a turret and discharge at an exit chute located approximately 180° from the feed position (in other words, on the opposite side of the liner machine system). The positioning of the downstackers in the disclosed liner machine systems facilitates more travel distance for the can end from where it is fed to where it is discharged, thereby increasing the lining time of an individual can end.

In some implementations, the sealant liner apparatus includes at least one chuck member to support an individual can end and rotate the individual can end for sealing compound application. In some implementations, the sealant liner apparatus also includes two lower chuck drives, each lower chuck drive configured to each rotate in a direction opposite the other lower chuck drive.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

These and various other features and advantages will be apparent from a reading of the following Detailed Description.

DETAILED DESCRIPTION

Figure 1:
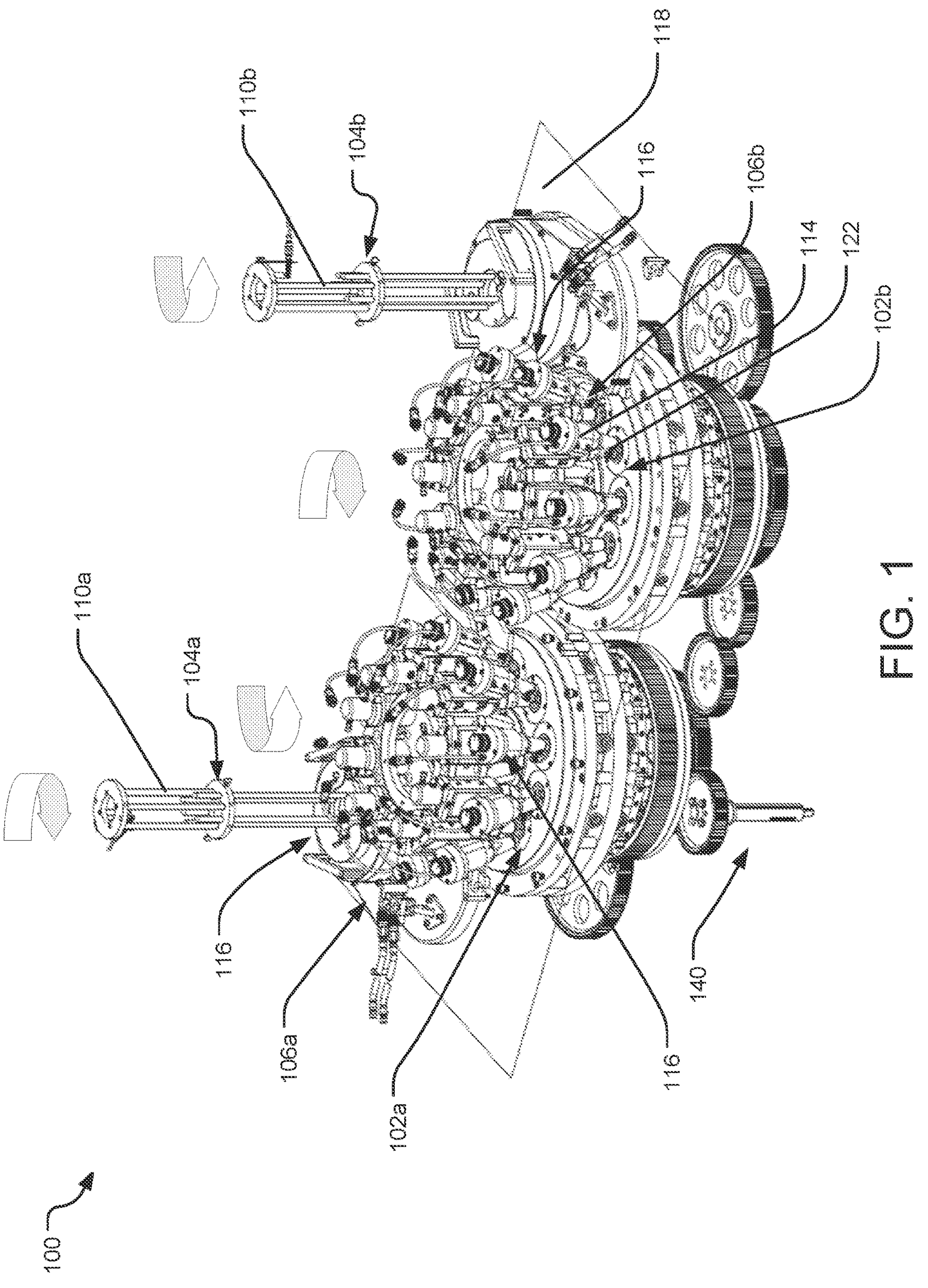
FIG. 1 illustrates an example of a turret liner machine system in accordance with aspects of the present disclosure.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular implementations, it should be appreciated that the features described with respect to one implementation may be incorporated with some implementations as well. Similarly, however, no single feature or features of any described implementation should be considered essential to the invention, as some implementations of the invention may omit such features.

The disclosed technology includes methods, systems, devices, and apparatuses that support liner machines for applying a sealing compound to an article. Generally, the described technology provides for turret liner machines for applying sealing compound to a container closure member or can end, where the turrets and their respective starwheels move in synchronized timing, the turrets moving in opposite directions from each other and in opposite directions from their respective starwheels, or to move independently, where each turret can move while the other turret is moving or not moving.

Each turret may be connected to a downstacker, which is a feed unit that separates and feeds the can ends or lids (e.g., aluminum can lids) to each turret. In some implementations, the disclosed technology includes a dual turret liner machine for applying a sealing compound to an article, and more particularly, for applying a sealing compound to a can end or lid. The dual turret liner machine applies a sealant to metal lids, each metal lid being received from a supply conveyor and discharged to a discharge conveyor via an exit chute. In some implementations, the dual turret liner machine includes two turret systems driven by a single main drive motor. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems may be referred to herein as the system including a turret, a plurality of workstations, and applicators with nozzles for sealant application. Each turret system may be adapted to receive lids from a starwheel which is adapted to receive the lids from a downstacker. The turret systems may be installed at the top of a table or platform surface and rotate in opposition directions from one another. The turret systems each include a plurality of workstations which extend out from each turret facing away from each other.

Specifically, each individual workstation receives an individual lid from a downstacker. In the dual turret system, the liner machine includes two downstackers, each downstacker connected to each turret system. A starwheel adapted to deliver lids from the downstacker to the turret is rotatable in an opposite direction from its respective turret, and in an opposite direction from the other starwheel. Sealant injectors or applications may be installed in the workstations to apply sealant to each metal lid as the lids rotate around each turret.

Figure 2:
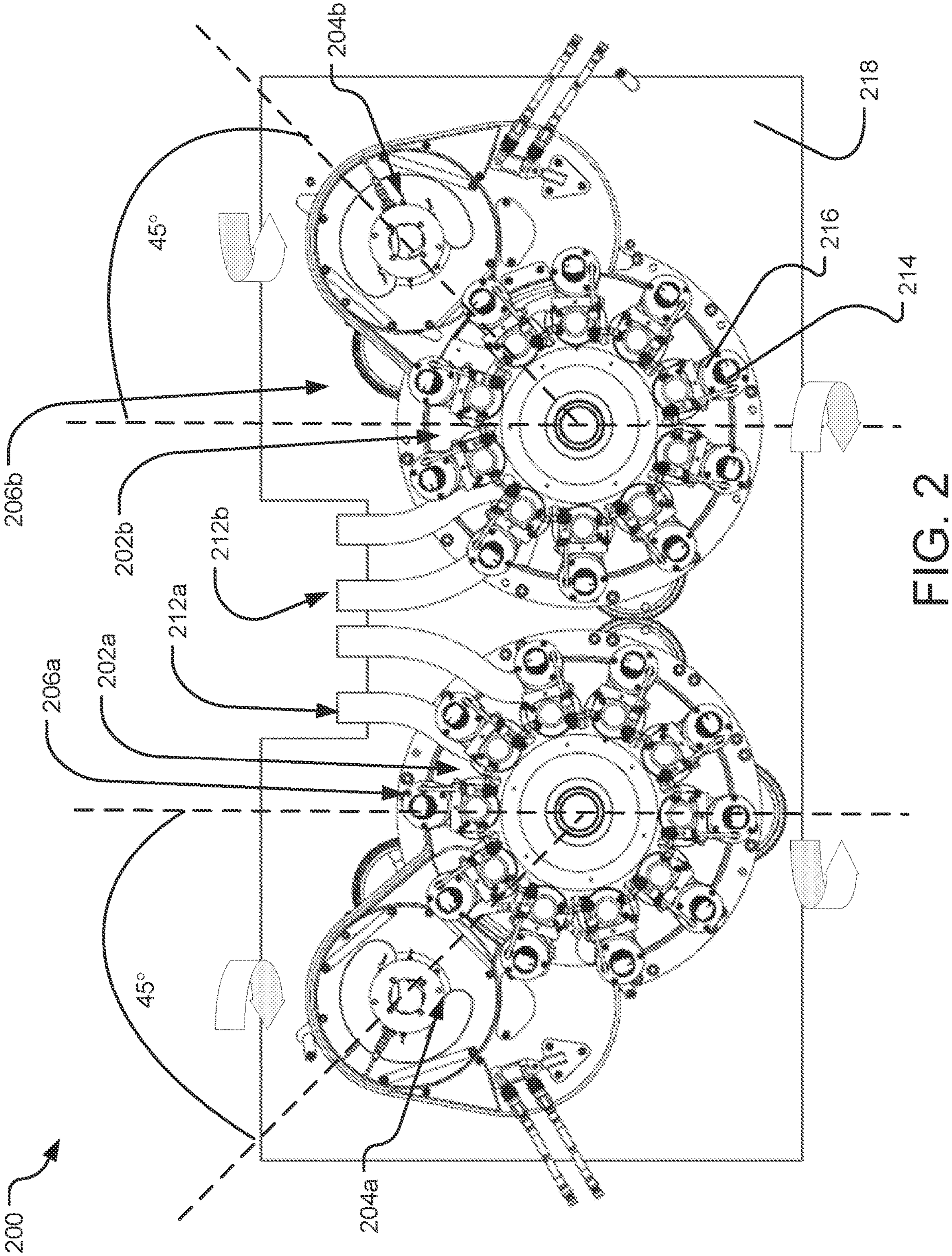
FIG. 2 illustrates an example of a turret liner machine system in accordance with aspects of the present disclosure.

When applying sealant to a can end or container closure member, it may be desirable to closely control the lining time of the can ends. It may be beneficial to maximize the application time of sealant on can ends in order to ensure comprehensive coverage. In the disclosed technology, the downstackers are located at the outer corner edges of the liner machine system, at approximately ±45° from the center axis of the turret (as shown in FIG. 2, depicted with the arrows and axis line), rather than directly opposite the exit chutes to allow for additional lining time of the can ends.

When a lid or can end leaves a starwheel, the can end is in a down position. The starwheel rotates the lid around to meet a lower chuck. The lower chuck picks up the lid, and the lift cam lifts the lower chuck to a workstation on the turret system. When the lift cam is in the up position, rising above the platform to the applicator, the lid is rotated approximately 150° in the upright position, as the sealant is applied to the lid. In the disclosed technology, as a result of the locations of each downstacker, each lift cam is elongated. The longer length of the lift cam allows for the lid or can end to be on the lift cam longer, thus, allowing for more sealant application time. In other liner machine technology, lift cams are approximately 125° in duration (of a 360° rotation) in the upright position (not accounting for the up ramp and down ramp distance). In the disclosed technology, the lift cams are approximately 150° degrees because of the distance from a downstacker to the exit chute.

As a result of the configurations, and shared components and processes included in the disclosed systems, there are lower labor costs (more EPM results in less staffing), smaller machine footprints (e.g., an example machine may be 18 sq ft running 5500 epm compared to 19 sq ft running at 2500 epm, less machines requiring less user aisle space), lower power costs (less energy required), increased lining time, easier maintenance, and a single compound supply for the certain systems (e.g., 5550 epm requires only one compound drop).

Aspects of the disclosure are further illustrated by and described with reference to apparatus diagrams, system diagrams, and flowcharts that relate to liner machines for applying a sealing compound to an article.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

FIG. 1 illustrates an example of a turret liner machine system 100 in accordance with aspects of the present disclosure. Specifically, FIG. 1 is a perspective view of a synchronized dual turret liner machine system 100 for applying a sealing compound to a can end or lid 490 (shown in FIG. 4). The synchronized dual turret liner machine 100 applies a sealant (not shown) to metal lids, each metal lid being received from a supply conveyor (not shown) and discharged to a discharge conveyor (not shown) via an exit chute (see, e.g., exit chute 212*a* and 212*b* in FIG. 2). In the illustrated embodiment, the dual turret liner machine 100 includes two turret systems 102*a* and 102*b* driven by a single main drive motor 140. The main drive motor 140 located proximate to the first turret system may be configured to operate in conjunction with the main drive driven gear located proximate to the second turret system. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 102*a* and 102*b* may be referred to herein as systems including turrets 106*a* and 106*b*, a plurality of workstations 116, and applicators 114 with nozzles 122 for sealant application. Each turret system may be adapted to receive lids from a starwheel (see. e.g., starwheels 520*a* and 520*b* in FIG. 5) which is adapted to receive the lids from a downstacker (e.g., downstackers 104*a* and 104*b*). The turret systems 102*a* and 102*b* may be installed at the top of a table or platform surface 118 and rotate in opposition directions from one another (as depicted by the arrows). The turret systems 102*a* and 102*b* each include a plurality of workstations 116 which extend out from each turret system facing away from each other.

The workstations 116 receive an individual lid from a downstacker. In the dual turret system 100, there are two downstackers 104*a* and 104*b*, each downstacker connected to each turret system 102*a* and 102*b*. The starwheels 520*a* and 520*b* adapted to deliver lids from each downstacker to each turret are rotatable in an opposite direction from its respective turret, and in an opposite direction from the other starwheel 520*b* or 520*a*. Sealant injectors or applications 114 may be installed in the workstations to apply sealant to each metal lid as the lids rotate around each turret 106*a* and 106*b*.

As shown in FIG. 1, a rod cage (e.g., rod cage 110*a* or 110*b*) is attached to each downstacker 104*a* and 104*b*. In some implementations, rod cages 110*a* and 110*b* may not be used and a belt (not shown) or conveyor (not shown) feeds can ends directly into the machine.

When applying sealant to a can end or container closure member, it may be desirable to closely control the lining time of the can ends. It may be beneficial to maximize the application time of sealant on can ends in order to ensure comprehensive coverage. In the disclosed technology, the downstackers are located at the outer corner edges of the liner machine system, at approximately ±45° from the center axis of the turrets 106*a* and 106*b* (as shown in more detail in FIG. 2, depicted with the arrows and axis line), rather than directly opposite the exit chutes (see, e.g., exit chutes 212*a* and 212*b* in FIG. 2) on the other side of the table or platform, to allow for additional lining time of the can ends.

As shown in FIG. 1, the turret liner machine system 100 includes two turret systems 102*a* and 102*b* operating in a single machine. The two turret systems 102*a* and 102*b* share a plurality of auxiliary systems that enable the turret liner machine system 100 to reduce complexity, reduce auxiliary systems, and reduce the overall footprint of the turret liner machine system 100. For example, the turret liner machine system 100 may include an electrical system (not shown), a compressed air system (not shown), an air cooler (not shown), an oil cooling system (not shown) including an oil cavity (not shown), and a feed of sealant (not shown). The arrangement of two turret systems 102*a* and 102*b* operating in a single machine enables the two turret systems 102*a* and 102*b* to share the auxiliary systems, reducing complexity, reducing auxiliary systems, and reducing the overall footprint of the turret liner machine system 100.

FIG. 2 illustrates an example of a turret liner machine system 200 in accordance with aspects of the present disclosure. Specifically, FIG. 2 is a top view of a synchronized dual turret liner machine system 200 for applying a sealing compound to a can end or lid 490 (shown in FIG. 4). The dual turret liner machine 200 applies a sealant to metal lids, each metal lid being received from a supply conveyor (not shown) and discharged to a discharge conveyor (not shown) via an exit chute e.g., exit chutes 212*a* and 212*b*. The dual turret liner machine 200 includes two turret systems 202*a* and 202*b* driven by a single main drive motor (see, e.g., main drive motor 140 in FIG. 1). In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 202*a* and 202*b* may be referred to herein as systems including turrets 206*a* and 206*b*, a plurality of workstations 216, and applicators 214 with nozzles (see, e.g., nozzles 122 in FIG. 1) for sealant application. Each turret system 202*a* and 202*b* may be adapted to receive lids from a starwheel (see. e.g., starwheels 520*a* and 520*b* in FIG. 5) which is adapted to receive the lids from a downstacker 204*a* and 204*b*. The turret systems 202*a* and 202*b* may be installed at the top of a table or platform surface 218 and rotate in opposition directions from one another (as depicted by the arrows). The turret systems 202*a* and 202*b* each include a plurality of workstations 216 which extend out from each turret system facing away from each other.

The workstations 216 receive an individual lid (not shown) from a downstacker. In the dual turret system 200, there are two downstackers 204*a* and 204*b*, each downstacker 204*a* and 204*b* connected to each turret system 202*a* and 202*b*. The starwheels 520*a* and 520*b* adapted to deliver lids from each downstacker to each turret 206*a* and 206*b* are rotatable in an opposite direction from its respective turret 206*a* and 206*b*, and in an opposite direction from the other starwheel 520*b* or 520*a*. Sealant injectors or applications 214 may be installed in the workstations 216 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 204*a* and 204*b* are located at the outer corner edges of the liner machine system, at approximately ±45° from the center axis of the turret (as depicted with the arrows and axis line), rather than directly opposite the exit chutes 212*a* and 212*b* on the other side of the table or platform, to allow for additional lining time of the can ends.

Figure 3:
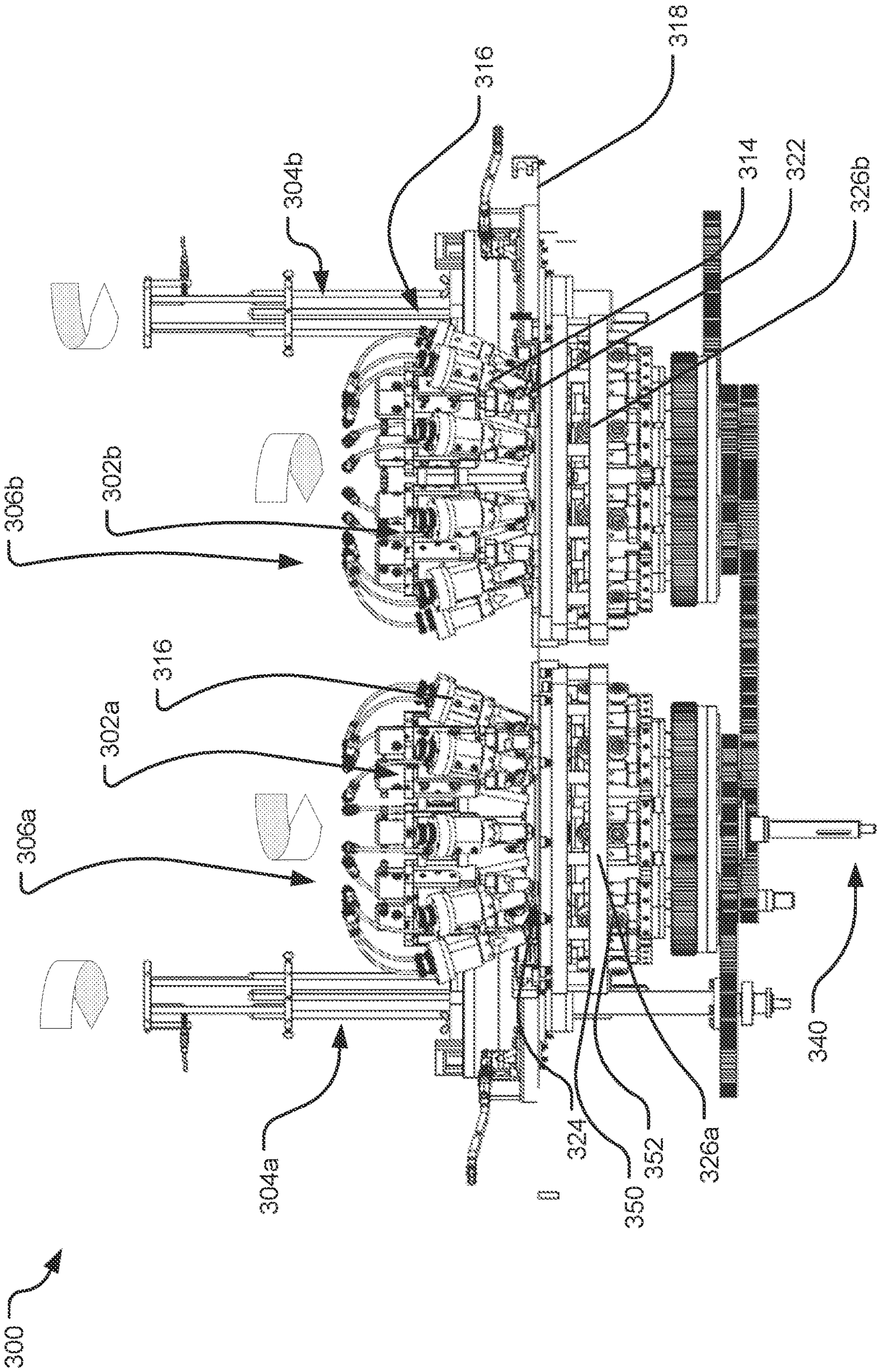
FIG. 3 illustrates an example of a turret liner machine system in accordance with aspects of the present disclosure.

FIG. 3 illustrates an example of a turret liner machine system 300 in accordance with aspects of the present disclosure. Specifically, FIG. 3 is a side view of a synchronized dual turret liner machine system 300 for applying a sealing compound to a can end or lid 490 (shown in FIG. 4). The dual turret liner machine 300 applies a sealant to metal lids, each metal lid being received from a supply conveyor (not shown) and discharged to a discharge conveyor (not shown) via an exit chute (see, e.g., exit chute 212*a* and 212*b* in FIG. 2). The dual turret liner machine 300 includes two turret systems 302*a* and 302*b* driven by a single main drive motor 340. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 302*a* and 302*b* may be referred to herein as systems including turrets 306*a* and 306*b*, a plurality of workstations 316, and applicators 314 with nozzles 322 for sealant application. Each turret system (e.g. turret system 302*a* or 302*b*) may be adapted to receive lids from a starwheel (see. e.g., starwheels 520*a* and 520*b* in FIG. 5) which is adapted to receive the lids from a downstacker 304*a* and 304*b*. The turret systems 302*a* and 302*b* may be installed at the top of a table or platform surface 318 and rotate in opposition directions from one another (as depicted by the arrows). The turret systems 302*a* and 302*b* each include a plurality of workstations 316 which extend out from each turret system facing away from each other.

The workstations 316 receive an individual lid from a downstacker (e.g., downstacker 304*a* and 304*b*). In the dual turret system 300, there are two downstackers 304*a* and 304*b*, each downstacker 304*a* or 304*b* connected to each turret system 302*a* and 302*b*. The starwheels 520*a* and 520*b* adapted to deliver lids from each downstacker 304*a* and 304*b* to each turret 306*a* and 306*b* are rotatable in an opposite direction from its respective turret 306*a* and 306*b*, and in an opposite direction from the other starwheel 520*b* or 520*a*. Sealant injectors or applications 314 may be installed in the workstations 316 to apply sealant to each metal lid as the lids rotate around each turret 306*a* and 306*b*.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 304*a* and 304*b* are located at the outer corner edges of the liner machine system, at approximately ±45° from the center axis of the turret, rather than directly opposite the exit chutes on the other side of the table or platform 318, to allow for additional lining time of the can ends.

When a lid or can end leaves a starwheel 520*a* or 520*b*, the can end is in a down position. The starwheel 520*a* or 520*b* rotates the lid around to meet a lower chuck 324. Specifically, each turret 306*a* and 306*b* includes a plurality of lower chucks 324 each configured to receive a lid, rotate the lid around the turret 306*a* and 306*b* and rotate the lid as the sealing compound is applied to the lid. The lower chucks 324 pick up the lid, and a lift cam 326*a* and 326*b* lifts the lower chuck 324 to a workstation 316 on the turret system 302*a* and 302*b*. The lift cam 324 includes a cam ring 350 and each lower chuck 324 includes a plurality of wheels 352 attached to each lower chuck 324 and configured to interface with the cam ring 350. The cam ring 350 is sized and shaped to raise each lower chuck 324 when the lower chuck 324 receives a lid such that the lid is positioned proximate a nozzle 322 to receive sealing compound. Additionally, the cam ring 350 is sized and shaped to lower each lower chuck 324 when the lower chuck 324 unloads a lid to an exit chute (see, e.g., exit chute 212*a* and 212*b* in FIG. 2). In the illustrated embodiment, the cam ring 350 includes a race (not shown) that has a variable height relative to the table or platform surface 318. The wheels 352 roll on the race and change the height of the lower chucks 324 as the lower chucks 324 rotate around the turret 306*a* and 306*b*.

When the lift cam 326 is in the up position, rising above the platform 318 to the applicator 314, the lid is rotated approximately 150° in the upright position, as the sealant is applied to the lid. In the disclosed technology, as a result of the locations of each downstacker, each lift cam 326 is elongated. The longer length of the lift cam 326 allows for the lid or can end to be on the lift cam 326 longer, thus, allowing for more sealant application time. In other liner machine technology, lift cams are approximately 125° in duration (of a 360° rotation) in the upright position (not accounting for the up ramp and down ramp distance). In the disclosed technology, the lift cam 326 is approximately 150° degrees because of the distance from a downstacker 304*a* or 304*b* to the exit chute 212*a* or 212*b*.

Moreover, the longer length of the lift cam 326 enables the turret systems 302*a* and 302*b* to rotate at a higher rate. Specifically, some can end machines only rotate at approximately 150 rotations per minute (rpm). In contrast, the longer length of the lift cam 326 enables the turret systems 302*a* and 302*b* described herein to rotate at approximately 250 rpm, enabling the turret systems 302*a* and 302*b* to process more can ends or lids 490. Additionally, the longer length of the lift cam 326 also enables the lid or can end 490 to be rotated about the lower chuck 324 three times as the lid or can end 490 is rotated about the lift cam 326. Rotating the lid or can end 490 three times about the lower chuck 324 also enables more sealant to be applied to the lid or can end 490. In contrast, at least some known can end machines only rotate the can end or lid once or twice. Thus, the longer length of the lift cam 326 enables more sealant to be applied to the can end or lid 490 and enables the turret systems 302*a* and 302*b* to process more can ends or lids 490.

Figure 4:
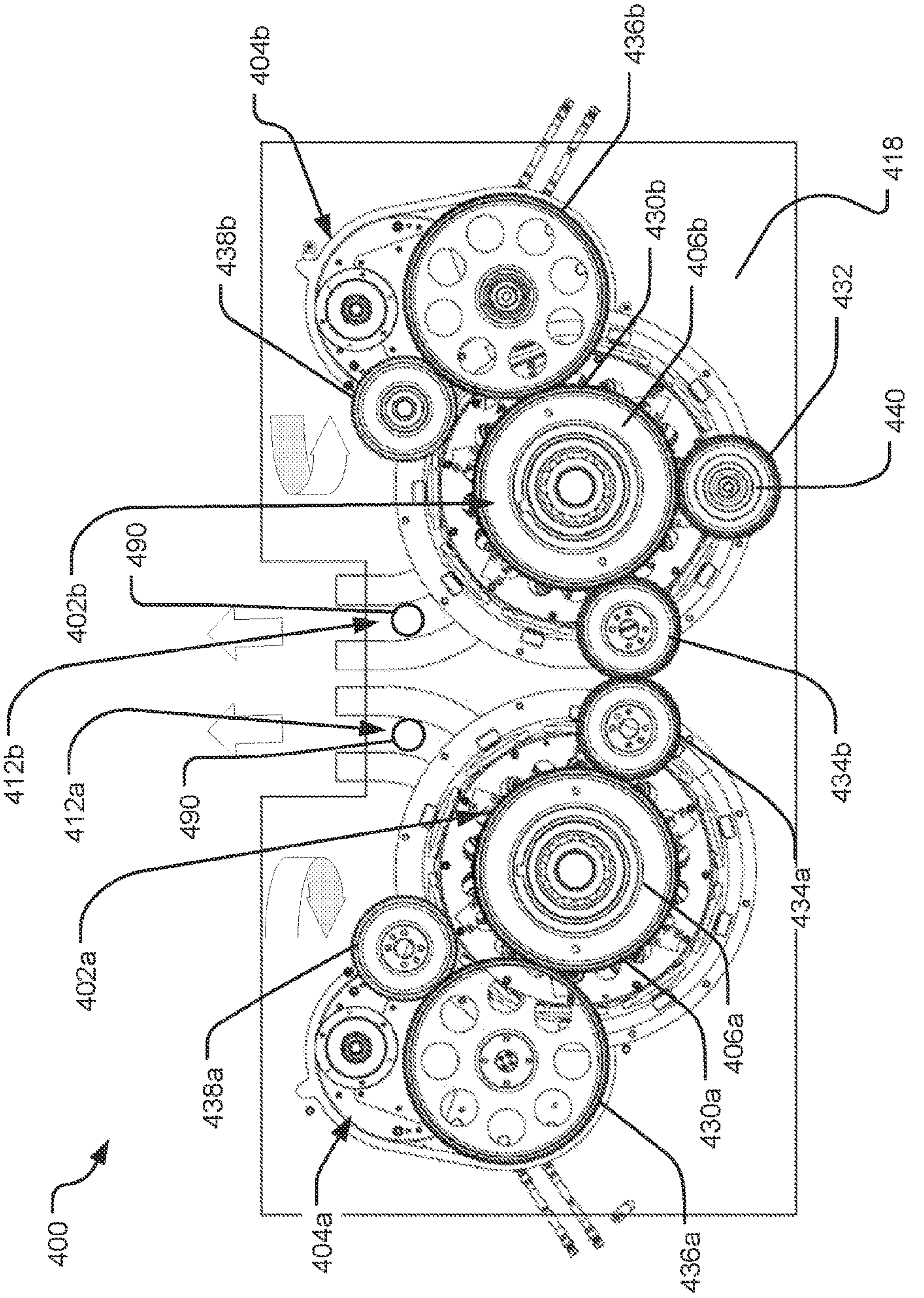
FIG. 4 illustrates an example of a turret liner machine system in accordance with aspects of the present disclosure.

FIG. 4 illustrates an example of a turret liner machine system 400 in accordance with aspects of the present disclosure. Specifically, FIG. 4 is a bottom view of a synchronized dual turret liner machine system 400 for applying a sealing compound (not shown) to a can end or lid 490. The dual turret liner machine 400 applies a sealant to metal lids, each metal lid being received from a supply conveyor (not shown) and discharged to a discharge conveyor (not shown) via an exit chute 412*a* and 412*b*. The dual turret liner machine 400 includes two turret systems 402*a* and 402*b* driven by a single main drive motor 440. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 402*a* and 402*b* may be referred to herein as systems including turrets 406*a* and 406*b*, a plurality of workstations (see. e.g., workstations 116, 216, and 316 in FIGS. 1-3), and applicators (see. e.g., ten applicators 114, 214, and 314 in FIGS. 1-3) with nozzles (see. e.g., nozzles 122, 222, and 322 in FIGS. 1-3) for sealant application. Each turret system 402*a* and 402*b* may be adapted to receive lids from a starwheel (see. e.g., starwheels 520*a* and 520*b* in FIG. 5) which is adapted to receive the lids from a downstacker (e.g., downstackers 404*a* and 404*b*). The turret systems 402*a* and 402*b* may be installed at the top of a table or platform surface 418 and rotate in opposition directions from one another (as depicted by the arrows). The turret systems 402*a* and 402*b* each include a plurality of workstations (see. e.g., workstations 116, 216, and 316 in FIGS. 1-3) which extend out from each turret system facing away from each other.

The workstations receive an individual lid from a downstacker 404*a* and 404*b*. In the dual turret system 400, there are two downstackers 404*a* and 404*b*, each downstacker 404*a* and 404*b* connected to each turret system 402*a* and 402*b*. The starwheels 520*a* and 520*b* adapted to deliver lids from each downstacker 404*a* and 404*b* to each turret are rotatable in an opposite direction from its respective turret, and in an opposite direction from the other starwheel 520*b* or 520*a*. Sealant injectors or applications may be installed in the workstations to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 404*a* and 404*b* are located at the outer corner edges of the liner machine system, at approximately ±45° from the center axis of the turret, rather than directly opposite the exit chutes on the other side of the table or platform, to allow for additional lining time of the can ends.

The turrets 406*a* and 406*b* each include a turret gear (e.g., a turret gear 430*a* or 430*b*), the main drive motor 440 includes a main drive gear 432, the turret liner machine system 400 includes two main drive driven gears 434*a* and 434*b*, the starwheels 520*a* and 520*b* each include a starwheel gear 436*a* and 436*b*, and the lower chucks 324 each include a lower chuck gear 438*a* and 438*b*. The turret gears 430*a* and 430*b* are configured to rotate the turrets 406*a* and 406*b*, the starwheel gears 436*a* and 436*b* are configured to rotate the starwheels 520*a* and 520*b*, and the lower chuck gears 438*a* and 438*b* are configured to rotate the lower chucks 324. In the illustrated embodiment, the main drive gear 432 is rotatably coupled to the turret gear 430*b*, the turret gear 430*b* is rotatably coupled to the main drive driven gear 434*b* and the starwheel gear 436*b*, the main drive driven gear 434*b* is rotatably coupled to the main drive driven gear 434*a*, the main drive driven gear 434*a* is rotatably coupled to the turret gear 430*a*, and the turret gear 430*a* is rotatably coupled to the starwheel gear 436*b*. In the illustrated embodiment, the lower chuck gear 438*a* and 438*b* are independently driven by a chuck gear motor (not shown). In alternative embodiments, the lower chuck gear 438*a* and 438*b* may be driven by the turret gears 430*a* and 430*b*, the starwheel gears 436*a* and 436*b*, the main drive gear 432, and/or the main drive driven gears 434*a* and 434*b*.

During operations, the main drive motor 440 rotates the main drive gear 432 which rotates the turret gear 430*b*. The turret gear 430*b* rotates the turret 406*b*, the main drive driven gear 434*b*, and the starwheel gear 436*b*. The starwheel gear 436*b* rotates the starwheel 520*b*. The main drive driven gear 434*b* rotates the main drive driven gear 434*a* which rotates the turret gear 430*a*. The turret gear 430*a* rotates the turret 406*a* and the starwheel gear 436*a*. The starwheel gear 436*a* rotates the starwheel 520*a*. Accordingly, in the illustrated embodiment, the turret gears 430*a* and 430*b*, the main drive gear 432, the main drive driven gears 434*a* and 434*b*, the starwheel gears 436*a* and 436*b*, and the lower chuck gears 438*a* and 438*b* are arranged to drive both turret systems 402*a* and 402*b* with a single main drive motor 440, reducing complexity, reducing auxiliary systems, and reducing the overall footprint of the turret liner machine system 400.

Figure 5:
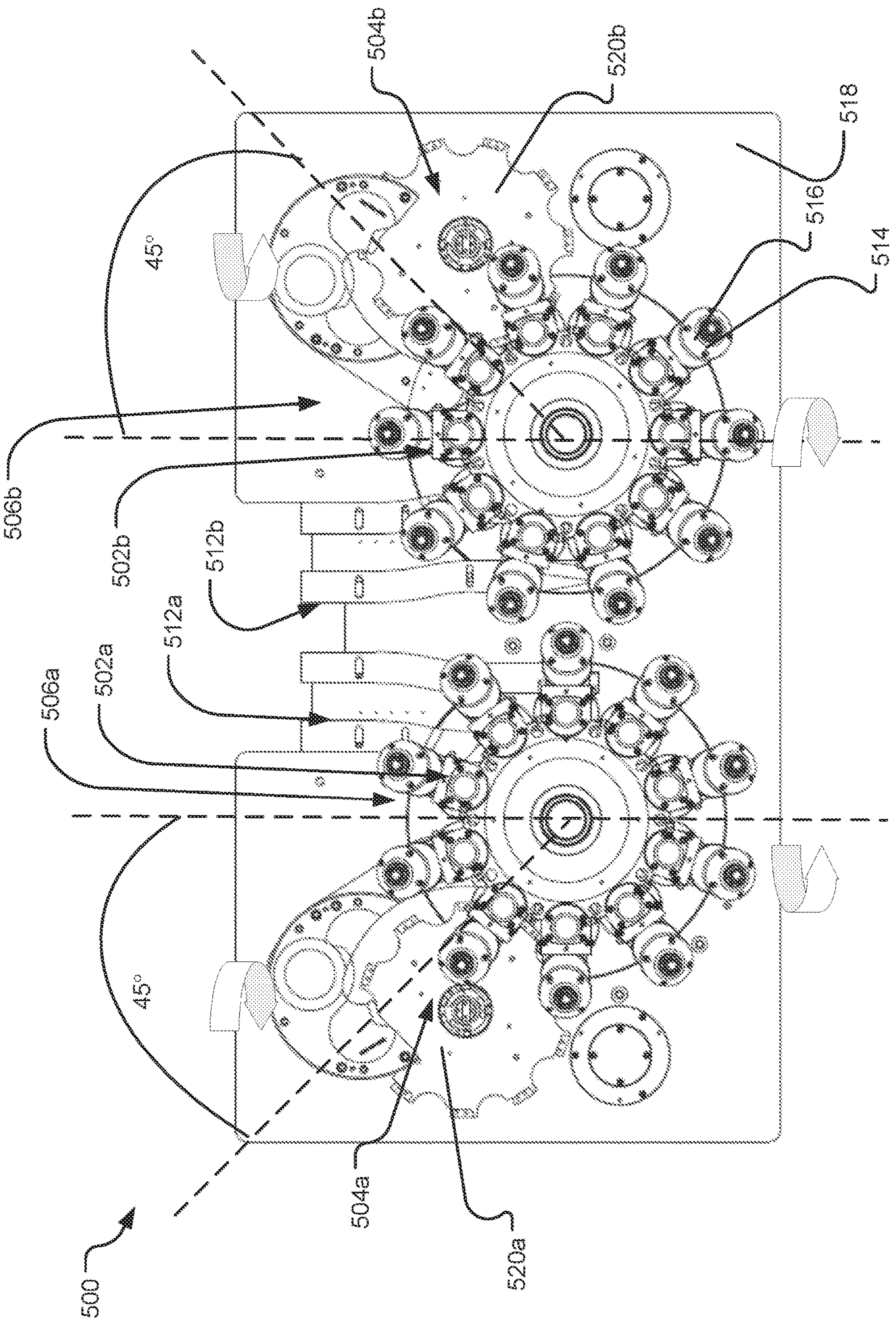
FIG. 5 illustrates an example of a turret liner machine system in accordance with aspects of the present disclosure.

FIG. 5 illustrates an example of a turret liner machine system 500 in accordance with aspects of the present disclosure. Specifically, FIG. 5 is a top view of a synchronized dual turret liner machine system 500 for applying a sealing compound to a can end or lid 490 (shown in FIG. 4). The dual turret liner machine 500 applies a sealant to metal lids, each metal lid being received from a supply conveyor (not shown) and discharged to a discharge conveyor (not shown) via an exit chute 512. The dual turret liner machine 500 includes two turret systems 502*a* and 502*b* driven by a single main drive motor (see, e.g., main drive motor 440 in FIG. 4).

In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 502*a* and 502*b* may be referred to herein as systems including a turret 506*a* and 506*b*, a plurality of workstations 516, and applicators 514 with nozzles (see, e.g., nozzles 122 in FIG. 1) for sealant application. Each turret system 502*a* and 502*b* may be adapted to receive lids from a starwheel 520*a* and 520*b* which is adapted to receive the lids from a downstacker 504*a* and 504*b*). The turret systems 502*a* and 502*b* may be installed at the top of a table or platform surface 518 and rotate in opposition directions from one another (as depicted by the arrows). The turret systems 502*a* and 502*b* each include a plurality of workstations 516 which extend out from each turret system facing away from each other.

The workstations 516 receive an individual lid (not shown) from a downstacker 504*a* and 504*b*. In the dual turret system 500, there are two downstackers 504*a* and 504*b*, each downstacker 504*a* and 504*b* connected to each turret system 502*a* and 502*b*. The starwheels 520*a* and 520*b* adapted to deliver lids from each downstacker to each turret 506*a* and 506*b* is rotatable in an opposite direction from its respective turret 506*a* and 506*b*, and in an opposite direction from the other starwheel 520*b* or 520*a*. Sealant injectors or applications 514 may be installed in the workstations 516 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 504*a* and 504*b* are located at the outer corner edges of the liner machine system, at approximately ±45° from the center axis of the turret (as depicted with the arrows and axis line), rather than directly opposite the exit chutes 512*a* and 512*b* on the other side of the table or platform, to allow for additional lining time of the can ends.

Figure 6:
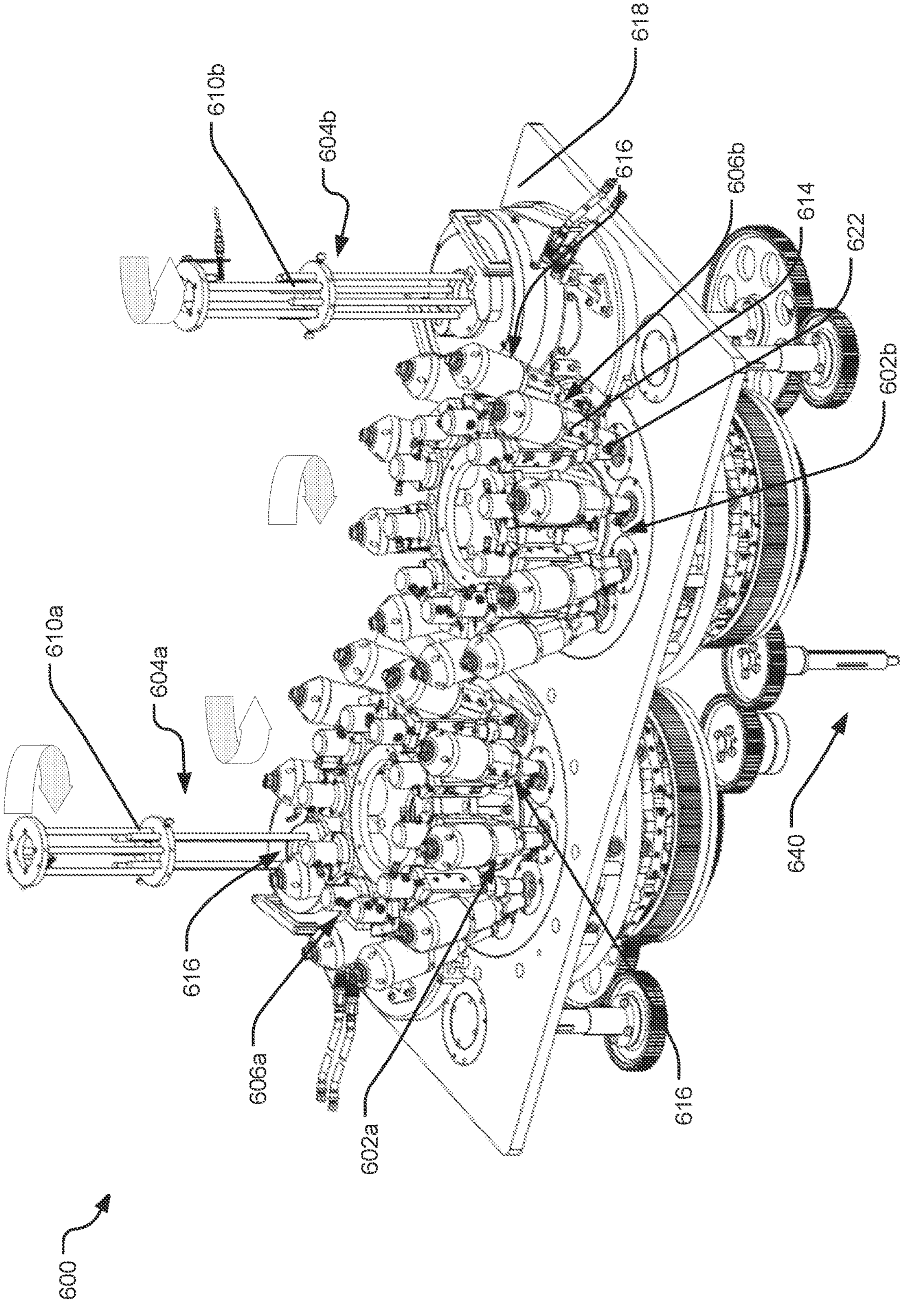
FIG. 6 illustrates an example of a turret liner machine system in accordance with aspects of the present disclosure.

FIG. 6 illustrates an example of a turret liner machine system 600 in accordance with aspects of the present disclosure. Specifically, FIG. 6 is a perspective view of a synchronized dual turret liner machine system 600 for applying a sealing compound to a can end or lid 790 (shown in FIG. 7). The synchronized dual turret liner machine 600 applies a sealant (not shown) to metal lids, each metal lid being received from a supply conveyor (not shown) and discharged to a discharge conveyor (not shown) via an exit chute (see, e.g., exit chute 712*a* and 712*b* in FIG. 7). In the illustrated embodiment, the dual turret liner machine 600 includes two turret systems 602*a* and 602*b* driven by a single main drive motor 640. The main drive motor 640 located proximate to the first turret system may be configured to operate in conjunction with the main drive driven gear located proximate to the second turret system. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 602*a* and 602*b* may be referred to herein as systems including a turret 606*a* and 606*b*, a plurality of workstations 616, and applicators 614 with nozzles 622 for sealant application. Each turret system may be adapted to receive lids from a starwheel (see. e.g., starwheels 1020*a* and 1020*b* in FIG. 10) which is adapted to receive the lids from a downstacker (e.g., downstackers 604*a* and 604*b*). The turret systems 602*a* and 602*b* may be installed at the top of a table or platform surface 618 and rotate in opposition directions from one another (as depicted by the arrows). The turret systems 602*a* and 602*b* each include a plurality of workstations 616 which extend out from each turret system facing away from each other.

The workstations 616 receive an individual lid from a downstacker. In the dual turret system 600, there are two downstackers 604*a* and 604*b*, each downstacker connected to each turret system 602*a* and 602*b*. The starwheels 1020*a* and 1020*b* adapted to deliver lids from each downstacker to each turret are rotatable in an opposite direction from its respective turret, and in an opposite direction from the other starwheel 1020*b* or 1020*a*. Sealant injectors or applications 614 may be installed in the workstations to apply sealant to each metal lid as the lids rotate around each turret 606*a* and 606*b*.

As shown in FIG. 6, a rod cage 610*a* and 610*b* is attached to each downstacker 604*a* and 604*b*. In some implementations, a rod cage 610*a* and 610*b* may not be used and a belt (not shown) or conveyor (not shown) feeds can ends directly into the machine.

When applying sealant to a can end or container closure member, it may be desirable to closely control the lining time of the can ends. It may be beneficial to maximize the application time of sealant on can ends in order to ensure comprehensive coverage. In the disclosed technology, the downstackers are located at the outer corner edges of the liner machine system, at approximately ±45° from the center axis of the turret 606*a* and 606*b* (as shown in more detail in FIG. 7, depicted with the arrows and axis line), rather than directly opposite the exit chutes (see, e.g., exit chute 712*a* and 712*b* in FIG. 7) on the other side of the table or platform, to allow for additional lining time of the can ends.

As shown in FIG. 6, the turret liner machine system 600 includes two turret systems 602*a* and 602*b* operating in a single machine. The two turret systems 602*a* and 602*b* share a plurality of auxiliary systems that enable the turret liner machine system 600 to reduce complexity, reduce auxiliary systems, and reduce the overall footprint of the turret liner machine system 600. For example, the turret liner machine system 600 may include an electrical system (not shown), a compressed air system (not shown), an air cooler (not shown), an oil cooling system (not shown) including an oil cavity (not shown), and a feed of sealant (not shown). The arrangement of two turret systems 602*a* and 602*b* operating in a single machine enables the two turret systems 602*a* and 602*b* to share the auxiliary systems, reducing complexity, reducing auxiliary systems, and reducing the overall footprint of the turret liner machine system 600.

Figure 7:
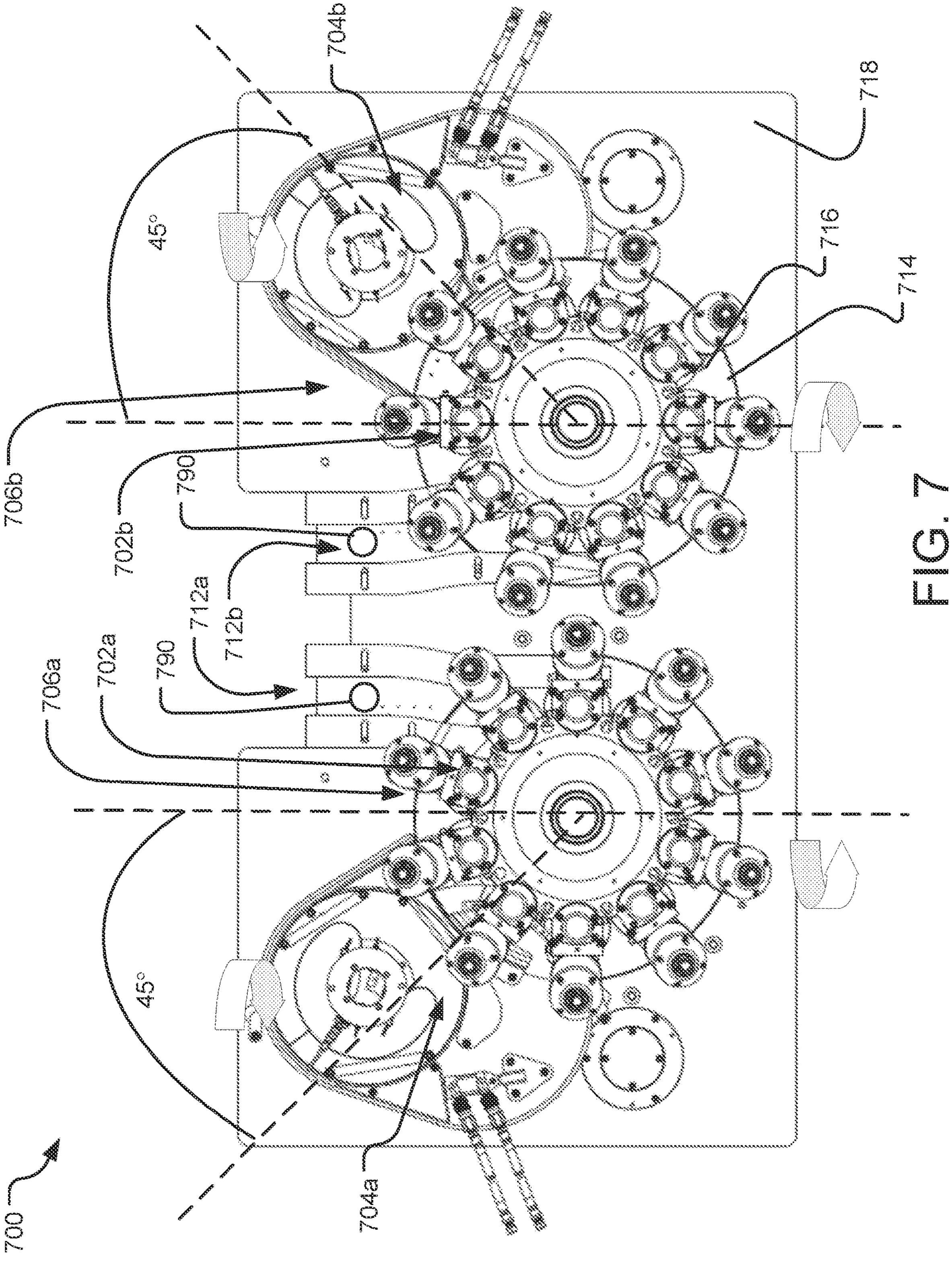
FIG. 7 illustrates an example of a turret liner machine system in accordance with aspects of the present disclosure.

FIG. 7 illustrates an example of a turret liner machine system 700 in accordance with aspects of the present disclosure. Specifically, FIG. 7 is a top view of a synchronized dual turret liner machine system 700 for applying a sealing compound to a can end or lid 790. The dual turret liner machine 700 applies a sealant to metal lids, each metal lid being received from a supply conveyor (not shown) and discharged to a discharge conveyor (not shown) via an exit chute 712*a* and 712*b*. The dual turret liner machine 700 includes two turret systems 702*a* and 702*b* driven by a single main drive motor (see, e.g., main drive motor 640 in FIG. 6). In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 702*a* and 702*b* may be referred to herein as systems including a turret 706*a* and 706*b*, a plurality of workstations 716, and applicators 714 with nozzles (see, e.g., nozzles 622 in FIG. 6) for sealant application. Each turret system 702*a* and 702*b* may be adapted to receive lids from a starwheel (see. e.g., starwheels 1020*a* and 1020*b* in FIG. 10) which is adapted to receive the lids from a downstacker 704*a* and 704*b*. The turret systems 702*a* and 702*b* may be installed at the top of a table or platform surface 718 and rotate in opposition directions from one another (as depicted by the arrows). The turret systems 702*a* and 702*b* each include a plurality of workstations 716 which extend out from each turret system facing away from each other.

The workstations 716 receive an individual lid (not shown) from a downstacker 704*a* and 704*b*. In the dual turret system 700, there are two downstackers 704*a* and 704*b*, each downstacker 704*a* and 704*b* connected to each turret system 702*a* and 702*b*. The starwheels 1020*a* and 1020*b* adapted to deliver lids from each downstacker to each turret 706*a* and 706*b* are rotatable in an opposite direction from its respective turret 706*a* and 706*b*, and in an opposite direction from the other starwheel 1020*b* or 1020*a*. Sealant injectors or applications 714 may be installed in the workstations 716 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 704*a* and 704*b* are located at the outer corner edges of the liner machine system, at approximately ±45° from the center axis of the turret (as depicted with the arrows and axis line), rather than directly opposite the exit chutes 712*a* and 712*b* on the other side of the table or platform, to allow for additional lining time of the can ends.

Figure 8:
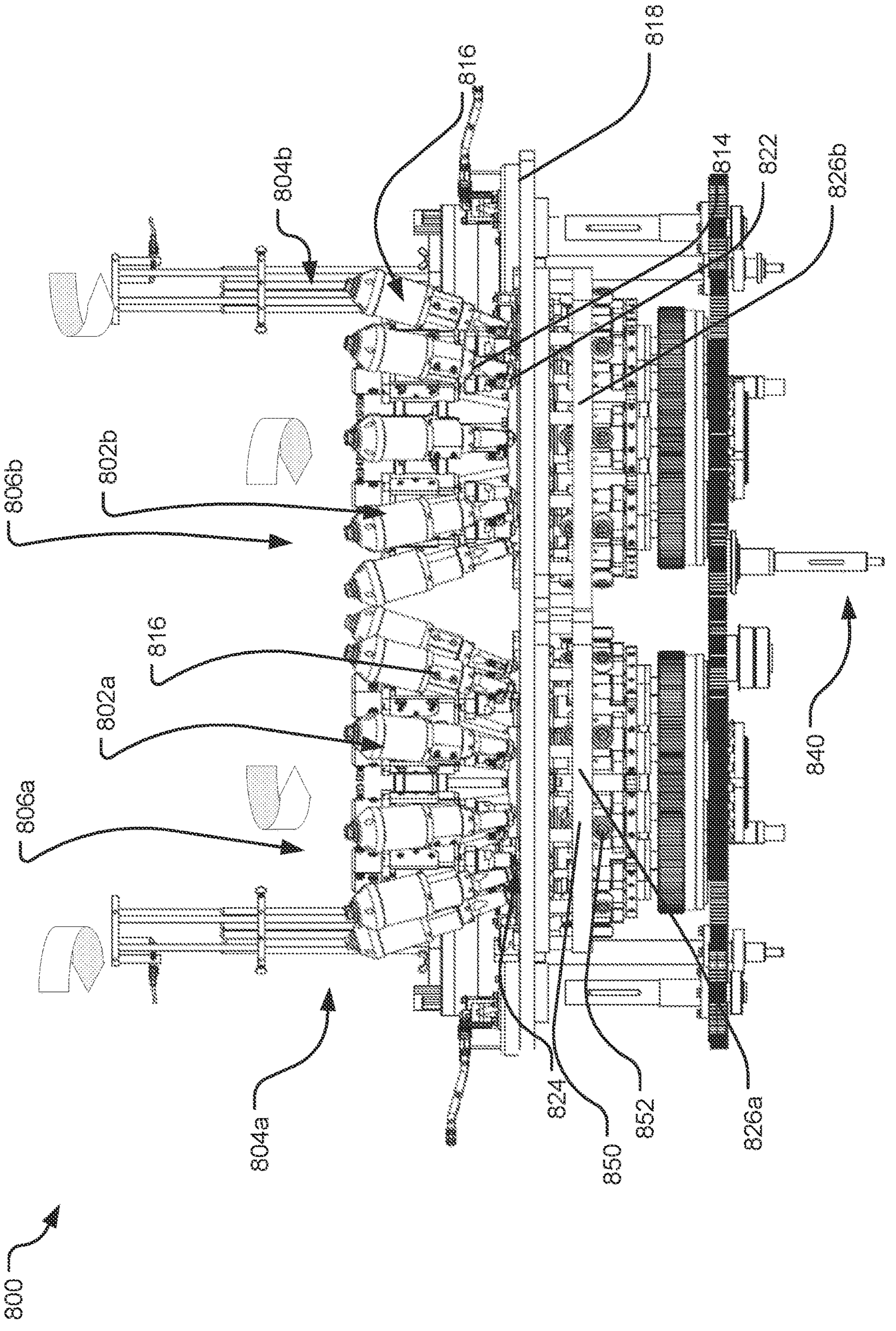
FIG. 8 illustrates an example of a turret liner machine system in accordance with aspects of the present disclosure.

FIG. 8 illustrates an example of a turret liner machine system 800 in accordance with aspects of the present disclosure. Specifically, FIG. 8 is a side view of a synchronized dual turret liner machine system 800 for applying a sealing compound to a can end or lid 790 (shown in FIG. 7). The dual turret liner machine 800 applies a sealant to metal lids, each metal lid being received from a supply conveyor (not shown) and discharged to a discharge conveyor (not shown) via an exit chute (see, e.g., exit chute 712*a* and 712*b* in FIG. 7). The dual turret liner machine 800 includes two turret systems 802*a* and 802*b* driven by a single main drive motor 840. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 802*a* and 802*b* may be referred to herein as systems including a turret 806*a* and 806*b*, a plurality of workstations 816, and applicators 814 with nozzles 822 for sealant application. Each turret system 802*a* and 802*b* may be adapted to receive lids from a starwheel (see. e.g., starwheels 1020*a* and 1020*b* in FIG. 10) which is adapted to receive the lids from a downstacker 804*a* and 804*b*. The turret systems 802*a* and 802*b* may be installed at the top of a table or platform surface 818 and rotate in opposition directions from one another (as depicted by the arrows). The turret systems 802*a* and 802*b* each include a plurality of workstations 816 which extend out from each turret system facing away from each other.

The workstations 816 receive an individual lid from a downstacker 804*a* and 804*b*. In the dual turret system 800, there are two downstackers 804*a* and 804*b*, each downstacker 804*a* and 804*b* connected to each turret system 802*a* and 802*b*. The starwheels 1020*a* or 1020*b* adapted to deliver lids from each downstacker 804*a* and 804*b* to each turret 806*a* and 806*b* are rotatable in an opposite direction from its respective turret 806*a* and 806*b*, and in an opposite direction from the other starwheel 1020*b* or 1020*a*. Sealant injectors or applications 814 may be installed in the workstations 816 to apply sealant to each metal lid as the lids rotate around each turret 806*a* and 806*b*.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 804*a* and 804*b* are located at the outer corner edges of the liner machine system, at approximately ±45° from the center axis of the turret, rather than directly opposite the exit chutes on the other side of the table or platform 818, to allow for additional lining time of the can ends.

When a lid or can end leaves a starwheel 1020*a* or 1020*b*, the can end is in a down position. The starwheel 1020*a* or 1020*b* rotates the lid around to meet a lower chuck 824. Specifically, each turret 806*a* and 806*b* includes a plurality of lower chucks 824 each configured to receive a lid, rotate the lid around the turret 806*a* and 806*b* and rotate the lid as the sealing compound is applied to the lid. The lower chucks 824 pick up the lid, and a lift cam 826*a* and 826*b* lifts the lower chuck 824 to a workstation 816 on the turret system 802*a* and 802*b*. The lift cam 824 includes a cam ring 850 and each lower chuck 824 includes a plurality of wheels 852 attached to each lower chuck 824 and configured to interface with the cam ring 850. The cam ring 850 is sized and shaped to raise each lower chuck 824 when the lower chuck 824 receives a lid such that the lid is positioned proximate a nozzle 822 to receive sealing compound. Additionally, the cam ring 850 is sized and shaped to lower each lower chuck 824 when the lower chuck 824 unloads a lid to an exit chute (see, e.g., exit chute 712*a* and 712*b* in FIG. 7). In the illustrated embodiment, the cam ring 850 includes a race (not shown) that has a variable height relative to the table or platform surface 818. The wheels 852 roll on the race and change the height of the lower chucks 824 as the lower chucks 824 rotate around the turret 806*a* and 806*b*.

When the lift cam 826 is in the up position, rising above the platform 818 to the applicator 814, the lid is rotated approximately 150° in the upright position, as the sealant is applied to the lid. In the disclosed technology, as a result of the locations of each downstacker, each lift cam 826 is longer. The longer length of the lift cam 826 allows for the lid or can end to be on the lift cam 826 longer, thus, allowing for more sealant application time. In other liner machine technology, lift cams are approximately 125° in duration (of a 360° rotation) in the upright position (not accounting for the up ramp and down ramp distance). In the disclosed technology, the lift cams 826 are approximately 150° degrees because of the distance from a downstacker 804*a* and 804*b* to the exit chute 712*a* and 712*b*.

Moreover, the longer length of the lift cam 826 enables the turret systems 802*a* and 802*b* to rotate at a higher rate. Specifically, some can end machines only rotate at 150 rotations per minute (rpm). In contrast, the longer length of the lift cam 826 enables the turret systems 802*a* and 802*b* described herein to rotate at 250 rpm, enabling the turret systems 802*a* and 802*b* to process more can ends or lids 790. Additionally, the longer length of the lift cam 826 also enables the lid or can end 790 to be rotated about the lower chuck 824 three times as the lid or can end 790 is rotated about the lift cam 826. Rotating the lid or can end 790 three times about the lower chuck 824 also enables more sealant to be applied to the lid or can end 790. In contrast, at least some known can end machines only rotate the can end or lid once or twice. Thus, the longer length of the lift cam 826 enables more sealant to be applied to the can end or lid 790 and enables the turret systems 802*a* and 802*b* to process more can ends or lids 790.

Figure 9:
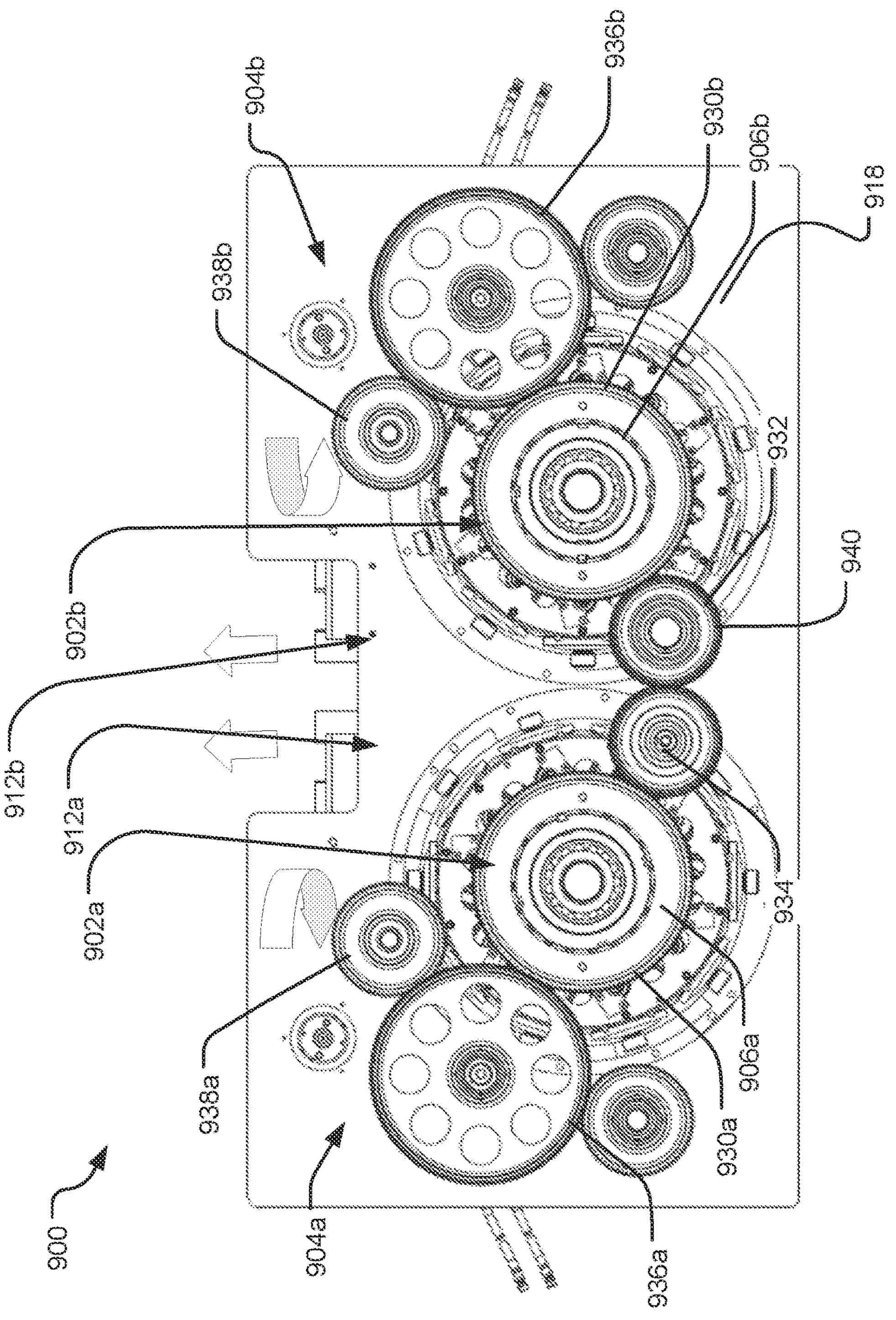
FIG. 9 illustrates an example of a turret liner machine system in accordance with aspects of the present disclosure.

FIG. 9 illustrates an example of a turret liner machine system 900 in accordance with aspects of the present disclosure. Specifically, FIG. 9 is a bottom view of a synchronized dual turret liner machine system 900 for applying a sealing compound (not shown) to a can end or lid 790 (shown in FIG. 7). The dual turret liner machine 900 applies a sealant to metal lids, each metal lid being received from a supply conveyor (not shown) and discharged to a discharge conveyor (not shown) via an exit chute 912*a* and 912*b*. The dual turret liner machine 900 includes two turret systems 902*a* and 902*b* driven by a single main drive motor 940. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 902*a* and 902*b* may be referred to herein as systems including a turret 906*a* and 906*b*, a plurality of workstations (see. e.g., workstations 616, 716, and 816 in FIGS. 6-8), and applicators (see. e.g., applicators 614, 714, and 814 in FIGS. 6-8) with nozzles (see. e.g., applicators 622, 722, and 822 in FIGS. 6-8) for sealant application. Each turret system 902*a* and 902*b* may be adapted to receive lids from a starwheel (see. e.g., starwheels 1020*a* and 1020*b* in FIG. 10) which is adapted to receive the lids from a downstacker (e.g., downstackers 904*a* and 904*b*). The turret systems 902*a* and 902*b* may be installed at the top of a table or platform surface 918 and rotate in opposition directions from one another (as depicted by the arrows). The turret systems 902*a* and 902*b* each include a plurality of workstations (see. e.g., workstations 616, 716, and 816 in FIGS. 6-8) which extend out from each turret system facing away from each other.

The workstations receive an individual lid from a downstacker 904*a* and 904*b*. In the dual turret system 900, there are two downstackers 904*a* and 904*b*, each downstacker 904*a* and 904*b* connected to each turret system 902*a* and 902*b*. The starwheels 1020*a* and 1020*b* adapted to deliver lids from each downstacker 904*a* and 904*b* to each turret are rotatable in an opposite direction from its respective turret, and in an opposite direction from the other starwheel 1020*b* or 1020*a*. Sealant injectors or applications may be installed in the workstations to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 904*a* and 904*b* are located at the outer corner edges of the liner machine system, at approximately ±45° from the center axis of the turret, rather than directly opposite the exit chutes on the other side of the table or platform, to allow for additional lining time of the can ends.

The turrets 906*a* and 906*b* each include a turret gear 930*a* and 930*b*, the main drive motor 940 includes a main drive gear 932, the turret liner machine system 900 includes a main drive driven gear 934, the starwheels 1020*a* or 1020*b* each include a starwheel gear 936*a* and 936*b*, and the lower chucks 824 each include a lower chuck gear 938*a* and 938*b*. The turret gears 930*a* and 930*b* are configured to rotate the turrets 906*a* and 906*b*, the starwheel gears 936*a* and 936*b* are configured to rotate the starwheels 1020*a* or 1020*b*, and the lower chuck gears 938*a* and 938*b* are configured to rotate the lower chucks 824. In the illustrated embodiment, the main drive gear 932 is rotatably coupled to the turret gear 930*b* and the main drive driven gear 934, the turret gear 930*b* is rotatably coupled to the starwheel gear 936*b*, the main drive driven gear 934 is rotatably coupled to the turret gear 930*a*, and the turret gear 930*a* is rotatably coupled to the starwheel gear 936*b*. In the illustrated embodiment, the lower chuck gear 938*a* and 938*b* are independently driven by a chuck gear motor (not shown). In alternative embodiments, the lower chuck gear 938*a* and 938*b* may be driven by the turret gears 930*a* and 930*b*, the starwheel gears 936*a* and 936*b*, the main drive gear 932, and/or the main drive driven gear 934.

During operations, the main drive motor 940 rotates the main drive gear 932 which rotates the turret gear 930*b* and the main drive driven gear 934. The turret gear 930*b* rotates the turret 906*b* and the starwheel gear 936*b* which rotates the starwheel 1020*b*. The main drive driven gear 934 rotates the turret gear 930*a*. The turret gear 930*a* rotates the turret 906*a* and the starwheel gear 936*a*. The starwheel gear 936*a* rotates the starwheel 1020*a*. Accordingly, in the illustrated embodiment, the turret gears 930*a* and 930*b*, the main drive gear 932, the main drive driven gears 934, the starwheel gears 936*a* and 936*b*, and the lower chuck gears 938*a* and 938*b* are arranged to drive both turret systems 902*a* and 902*b* with a single main drive motor 940, reducing complexity, reducing auxiliary systems, and reducing the overall footprint of the turret liner machine system 900.

Figure 10:
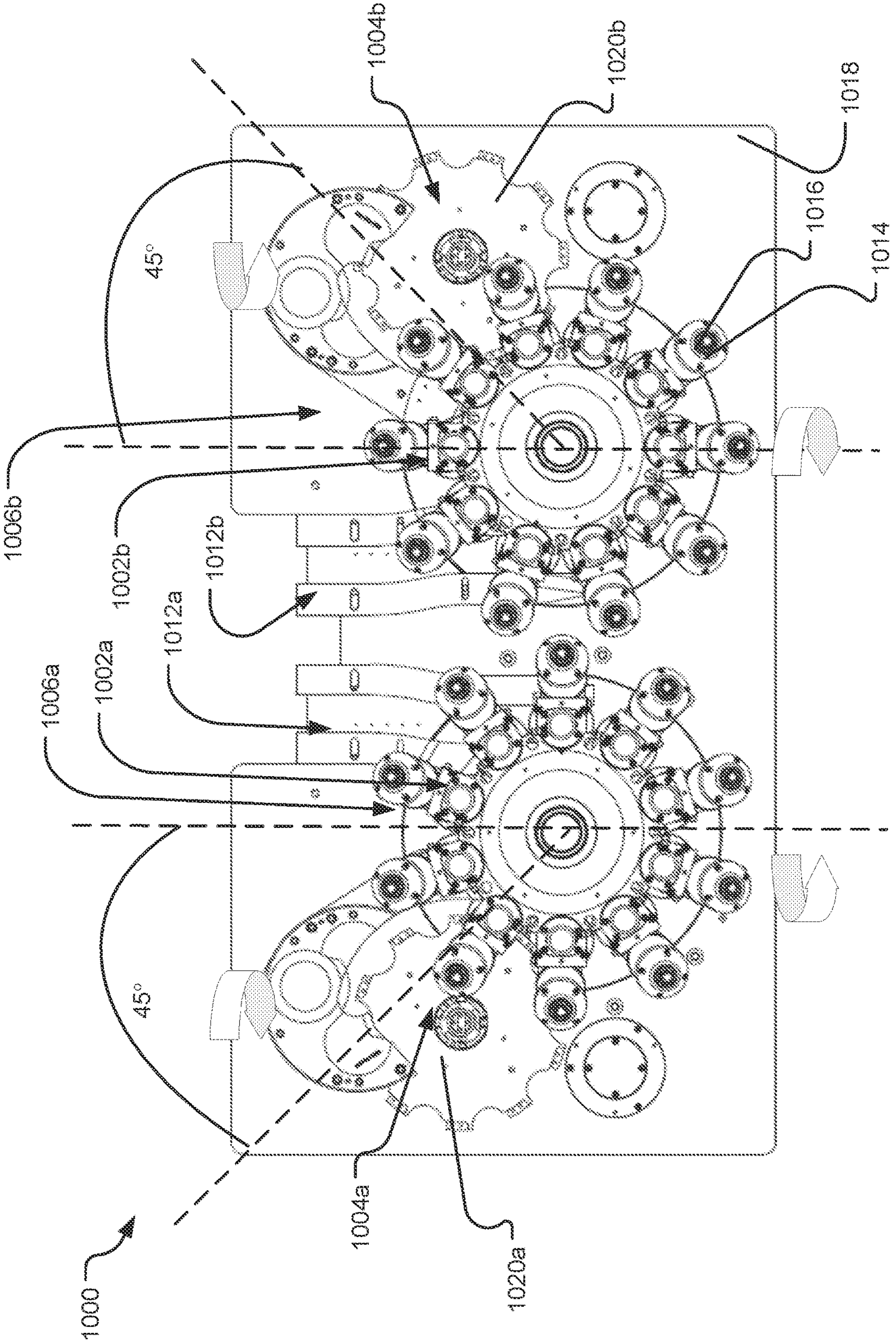
FIG. 10 illustrates an example of a turret liner machine system in accordance with aspects of the present disclosure.

FIG. 10 illustrates an example of a turret liner machine system 1000 in accordance with aspects of the present disclosure. Specifically, FIG. 10 is a top view of a synchronized dual turret liner machine system 1000 for applying a sealing compound to a can end or lid 790 (shown in FIG. 7). The dual turret liner machine 1000 applies a sealant to metal lids, each metal lid being received from a supply conveyor (not shown) and discharged to a discharge conveyor (not shown) via an exit chute 1012. The dual turret liner machine 1000 includes two turret systems 1002*a* and 1002*b* driven by a single main drive motor (see, e.g., main drive motor 940 in FIG. 9). In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1002*a* and 1002*b* may be referred to herein as systems including a turret 1006*a* and 1006*b*, a plurality of workstations 1016, and applicators 1014 with nozzles (see, e.g., nozzles 622 in FIG. 6) for sealant application. Each turret system 1002*a* and 1002*b* may be adapted to receive lids from a starwheel 1020*a* and 1020*b* which is adapted to receive the lids from a downstacker 1004*a* and 1004*b*). The turret systems 1002*a* and 1002*b* may be installed at the top of a table or platform surface 1018 and rotate in opposition directions from one another (as depicted by the arrows). The turret systems 1002*a* and 1002*b* each include a plurality of workstations 1016 which extend out from each turret system facing away from each other.

The workstations 1016 receive an individual lid (not shown) from a downstacker 1004*a* and 1004*b*. In the dual turret system 1000, there are two downstackers 1004*a* and 1004*b*, each downstacker 1004*a* and 1004*b* connected to each turret system 1002*a* and 1002*b*. The starwheels 1020*a* and 1020*b* adapted to deliver lids from each downstacker to each turret 1006*a* and 1006*b* is rotatable in an opposite direction from its respective turret 1006*a* and 1006*b*, and in an opposite direction from the other starwheel 1020*b* or 1020*a*. Sealant injectors or applications 1014 may be installed in the workstations 1016 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1004*a* and 1004*b* are located at the outer corner edges of the liner machine system, at approximately ±45° from the center axis of the turret (as depicted with the arrows and axis line), rather than directly opposite the exit chutes 1012*a* and 1012*b* on the other side of the table or platform, to allow for additional lining time of the can ends.

As shown in FIG. 10, the turret liner machine system 1000 includes two turret systems 1002*a* and 1002*b* operating in a single machine. The two turret systems 1002*a* and 1002*b* share a plurality of auxiliary systems that enable the turret liner machine system 1000 to reduce complexity, reduce auxiliary systems, and reduce the overall footprint of the turret liner machine system 1000. For example, the turret liner machine system 1000 may include an electrical system (not shown), a compressed air system (not shown), an air cooler (not shown), an oil cooling system (not shown) including an oil cavity (not shown), and a feed of sealant (not shown). The arrangement of two turret systems 1002*a* and 1002*b* operating in a single machine enables the two turret systems 1002*a* and 1002*b* to share the auxiliary systems, reducing complexity, reducing auxiliary systems, and reducing the overall footprint of the turret liner machine system 1000.

Figure 11:
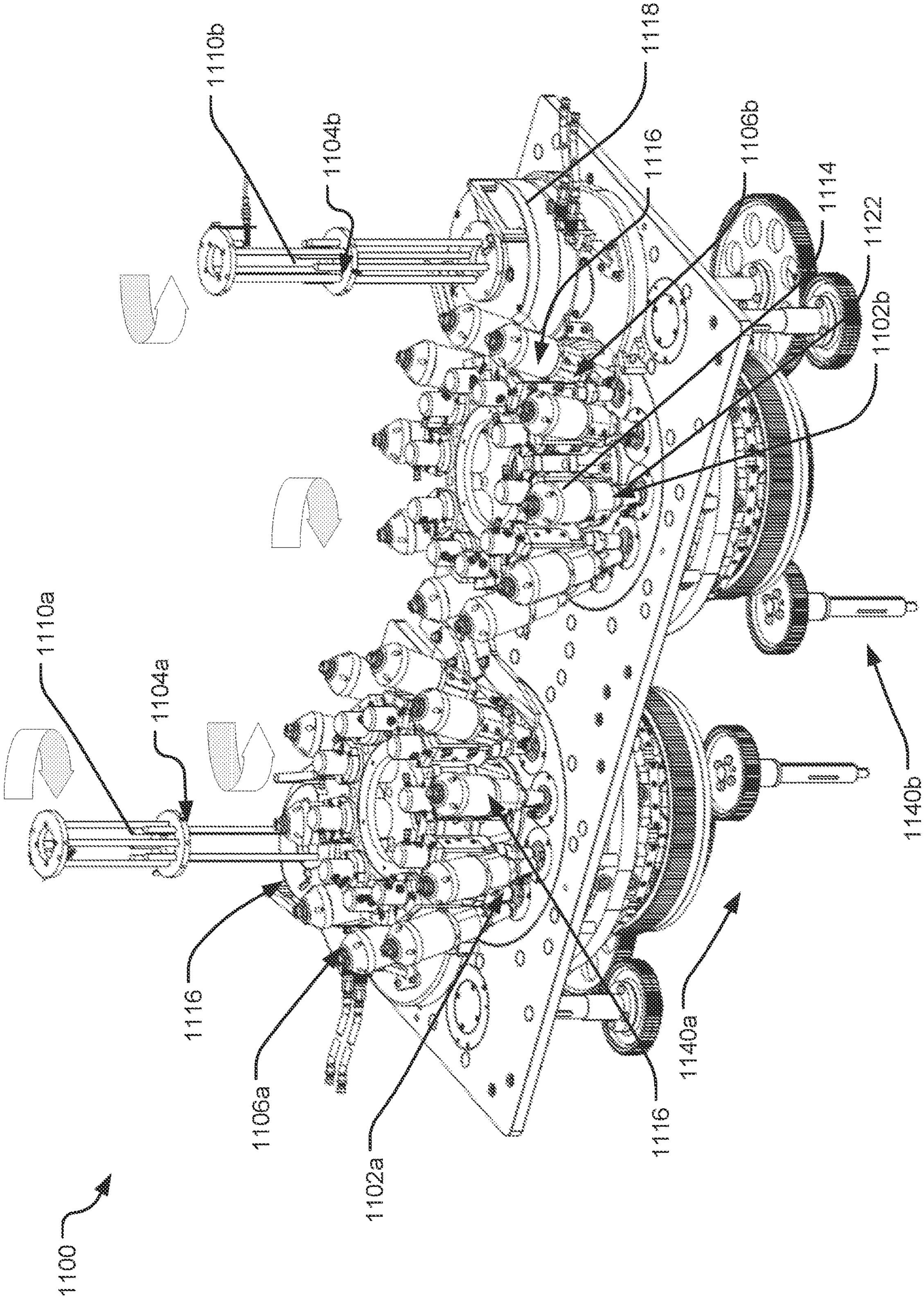
FIG. 11 illustrates an example of a turret liner machine system in accordance with aspects of the present disclosure.

FIG. 11 illustrates an example of a turret liner machine system 1100 in accordance with aspects of the present disclosure. Specifically, FIG. 11 is a perspective view of an asynchronized dual turret liner machine system 1100 for applying a sealing compound to a can end or lid 1290 (shown in FIG. 12). The asynchronized dual turret liner machine 1100 applies a sealant (not shown) to metal lids, each metal lid being received from a supply conveyor (not shown) and discharged to a discharge conveyor (not shown) via an exit chute (see, e.g., exit chute 1212*a* and 1212*b* in FIG. 12). In the illustrated embodiment, the dual turret liner machine 1100 includes two turret systems 1102*a* and 1102*b* driven by two independent main drive motors 1140*a* and 1140*b*. The main drive motors 1140*a* and 1140*b* are located proximate to the respective turret systems and may be configured to operate independently of each other to ensure that if one of the turret systems requires maintenance or breaks down, the other turret system can continue to operate, increasing production time and increasing profits. In some implementations, the liner machine technology may incorporate any number of turrets, drives, motors, chucks, chuck drives, downstackers, and starwheels. The disclosed technology is aimed at performing high speed and high-volume end production with scalable systems.

FIGS. 11-15 illustrates an example of an asynchronized or independent turret liner machine system in accordance with aspects of the present disclosure. Specifically, FIGS. 11-15 illustrate an independent turret liner machine system. Independent turret systems are configured where the first turret and its respective starwheel operate independently from the second turret. For example, the first turret and its respective starwheel may be operating while the second turret and its respective starwheel do not operate. This independent operation allows for access, downtime, and maintenance to one of the turrets and its respective system. In another example, the first turret and its respective starwheel may be operating while the second turret and its respective starwheel operate, yet each turret has the capability of operating or not operating when the other turret is operating. The advantages of independent turret liner machine systems are that one system if one system fails or is m turned off for maintenance, the other system may operate, resulting in less time and money lost.

The turret systems 1102*a* and 1102*b* may be referred to herein as systems including a turret 1106*a* and 1106*b*, a plurality of workstations 1116, and applicators 1114 with nozzles 1122 for sealant application. Each turret system may be adapted to receive lids from a starwheel (see. e.g., starwheels 1520*a* and 1520*b* in FIG. 15) which is adapted to receive the lids from a downstacker (e.g., downstackers 1104*a* and 1104*b*). The turret systems 1102*a* and 1102*b* may be installed at the top of a table or platform surface 1118 and rotate in opposition directions from one another (as depicted by the arrows). The turret systems 1102*a* and 1102*b* each include a plurality of workstations 1116 which extend out from each turret system facing away from each other.

The workstations 1116 receive an individual lid from a downstacker. In the dual turret system 1100, there are two downstackers 1104*a* and 1104*b*, each downstacker connected to each turret system 1102*a* and 1102*b*. The starwheels 1520*a* and 1520*b* adapted to deliver lids from each downstacker to each turret are rotatable in an opposite direction from its respective turret, and in an opposite direction from the other starwheel 1520*b* or 1520*a*. Sealant injectors or applications 1114 may be installed in the workstations to apply sealant to each metal lid as the lids rotate around each turret 1106*a* and 1106*b*.

As shown in FIG. 11, a rod cage 1110*a* and 1110*b* is attached to each downstacker 1104*a* and 1104*b*. In some implementations, a rod cage 1110*a* and 1110*b* may not be used and a belt (not shown) or conveyor (not shown) feeds can ends directly into the machine.

When applying sealant to a can end or container closure member, it may be desirable to closely control the lining time of the can ends. It may be beneficial to maximize the application time of sealant on can ends in order to ensure comprehensive coverage. In the disclosed technology, the downstackers are located at the outer corner edges of the liner machine system, at approximately ±45° from the center axis of the turret 1106*a* and 1106*b* (as shown in more detail in FIG. 12, depicted with the arrows and axis line), rather than directly opposite the exit chutes (see, e.g., exit chute 1212*a* and 1212*b* in FIG. 12) on the other side of the table or platform, to allow for additional lining time of the can ends.

Figure 12:
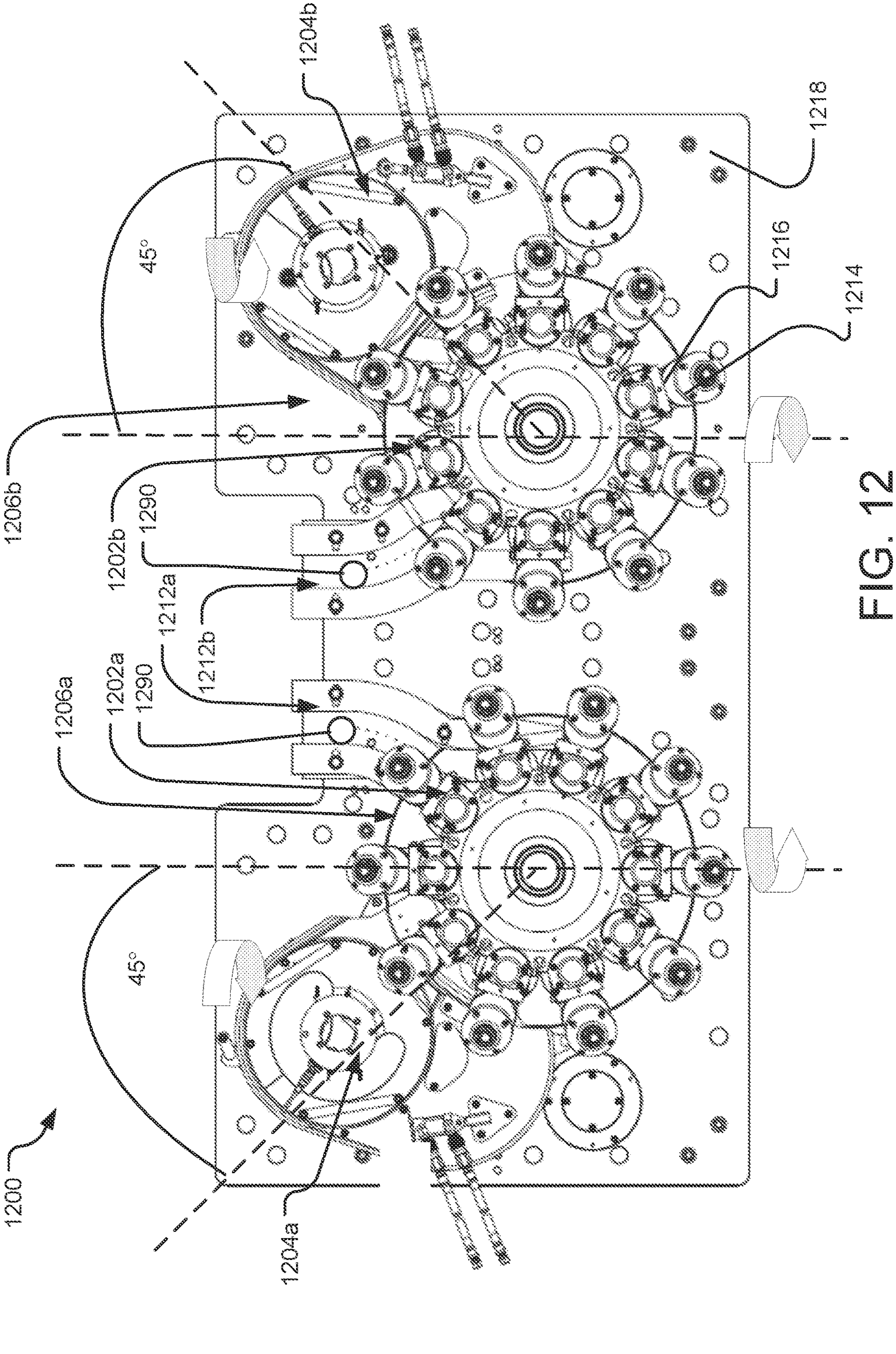
FIG. 12 illustrates an example of a turret liner machine system in accordance with aspects of the present disclosure.

FIG. 12 illustrates an example of a turret liner machine system 1200 in accordance with aspects of the present disclosure. Specifically, FIG. 12 is a top view of an asynchronized dual turret liner machine system 1200 for applying a sealing compound to a can end or lid 1290. The dual turret liner machine 1200 applies a sealant to metal lids, each metal lid being received from a supply conveyor (not shown) and discharged to a discharge conveyor (not shown) via an exit chute 1212*a* and 1212*b*. The dual turret liner machine 1200 includes two turret systems 1202*a* and 1202*b* driven by two main drive motors (see, e g, main drive motors 1140*a* and 1140*b* in FIG. 11). In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1202*a* and 1202*b* may be referred to herein as systems including a turret 1206*a* and 1206*b*, a plurality of workstations 1216, and applicators 1214 with nozzles (see, e.g., nozzles 1122 in FIG. 11) for sealant application. Each turret system 1202*a* and 1202*b* may be adapted to receive lids from a starwheel (see. e.g., starwheels 1520*a* and 1520*b* in FIG. 15) which is adapted to receive the lids from a downstacker 1204*a* and 1204*b*. The turret systems 1202*a* and 1202*b* may be installed at the top of a table or platform surface 1218 and rotate in opposition directions from one another (as depicted by the arrows). The turret systems 1202*a* and 1202*b* each include a plurality of workstations 1216 which extend out from each turret system facing away from each other.

The workstations 1216 receive an individual lid (not shown) from a downstacker 1204*a* and 1204*b*. In the dual turret system 1200, there are two downstackers 1204*a* and 1204*b*, each downstacker 1204*a* and 1204*b* connected to each turret system 1202*a* and 1202*b*. The starwheels 1520*a* and 1520*b* adapted to deliver lids from each downstacker to each turret 1206*a* and 1206*b* are rotatable in an opposite direction from its respective turret 1206*a* and 1206*b*, and in an opposite direction from the other starwheel 1520*b* or 1520*a*. Sealant injectors or applications 1214 may be installed in the workstations 1216 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1204*a* and 1204*b* are located at the outer corner edges of the liner machine system, at approximately ±45° from the center axis of the turret (as depicted with the arrows and axis line), rather than directly opposite the exit chutes 1212*a* and 1212*b* on the other side of the table or platform, to allow for additional lining time of the can ends.

Figure 13:
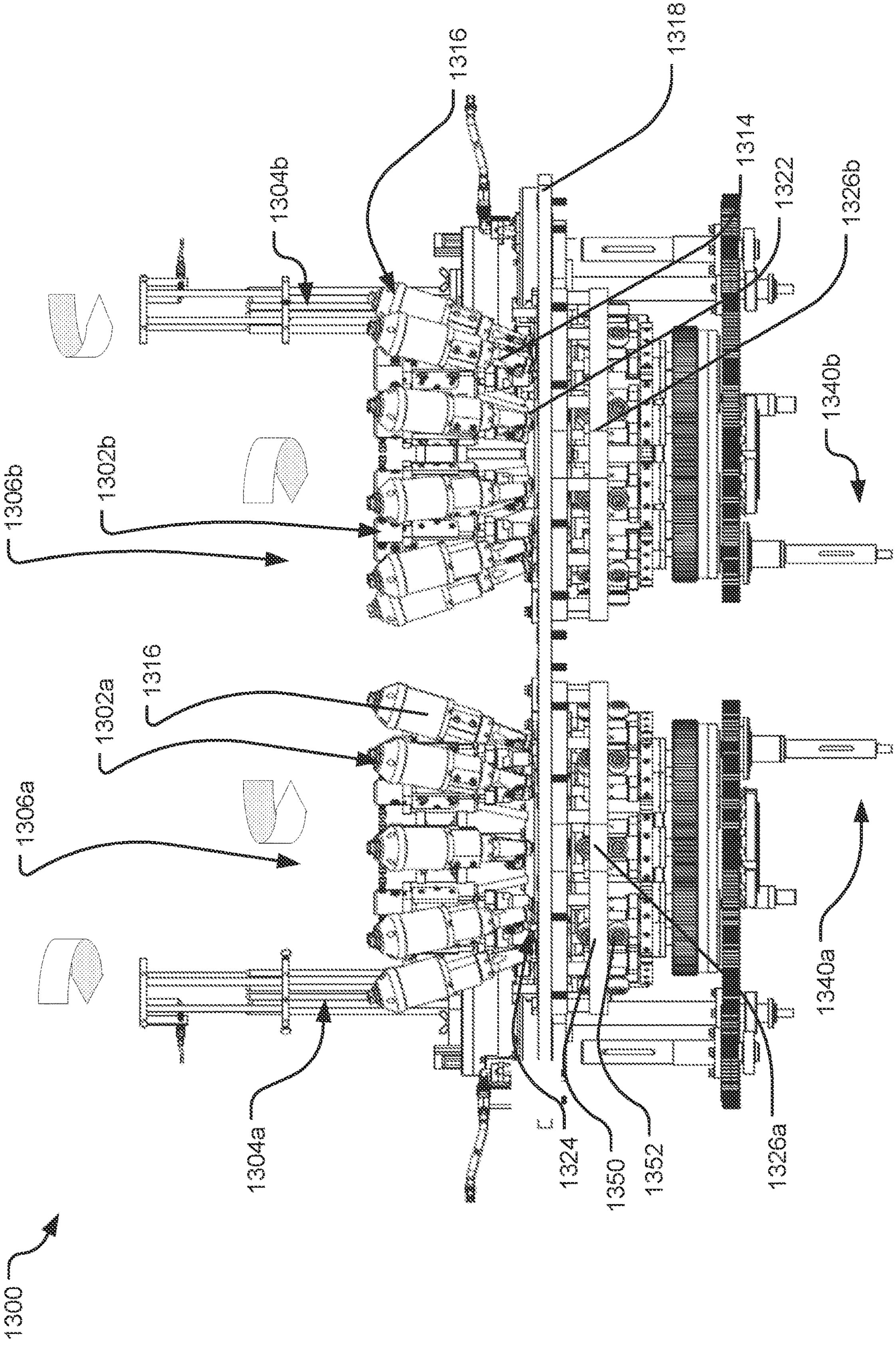
FIG. 13 illustrates an example of a turret liner machine system in accordance with aspects of the present disclosure.

FIG. 13 illustrates an example of a turret liner machine system 1300 in accordance with aspects of the present disclosure. Specifically, FIG. 13 is a side view of an asynchronized dual turret liner machine system 1300 for applying a sealing compound to a can end or lid 1290 (shown in FIG. 12). The dual turret liner machine 1300 applies a sealant to metal lids, each metal lid being received from a supply conveyor (not shown) and discharged to a discharge conveyor (not shown) via an exit chute (see, e.g., exit chute 1212*a* and 1212*b* in FIG. 12). The dual turret liner machine 1300 includes two turret systems 1302*a* and 1302*b* driven by two main drive motors 1340*a* and 1340*b*. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1302*a* and 1302*b* may be referred to herein as systems including a turret 1306*a* and 1306*b*, a plurality of workstations 1316, and applicators 1314 with nozzles 1322 for sealant application. Each turret system 1302*a* and 1302*b* may be adapted to receive lids from a starwheel (see. e.g., starwheels 1520*a* and 1520*b* in FIG. 15) which is adapted to receive the lids from a downstacker 1304*a* and 1304*b*. The turret systems 1302*a* and 1302*b* may be installed at the top of a table or platform surface 1318 and rotate in opposition directions from one another (as depicted by the arrows). The turret systems 1302*a* and 1302*b* each include a plurality of workstations 1316 which extend out from each turret system facing away from each other.

The workstations 1316 receive an individual lid from a downstacker 1304*a* and 1304*b*. In the dual turret system 1300, there are two downstackers 1304*a* and 1304*b*, each downstacker 1304*a* and 1304*b* connected to each turret system 1302*a* and 1302*b*. The starwheels 1520*a* or 1520*b* adapted to deliver lids from each downstacker 1304*a* and 1304*b* to each turret 1306*a* and 1306*b* are rotatable in an opposite direction from its respective turret 1306*a* and 1306*b*, and in an opposite direction from the other starwheel 1520*b* or 1520*a*. Sealant injectors or applications 1314 may be installed in the workstations 1316 to apply sealant to each metal lid as the lids rotate around each turret 1306*a* and 1306*b*.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1304*a* and 1304*b* are located at the outer corner edges of the liner machine system, at approximately ±45° from the center axis of the turret, rather than directly opposite the exit chutes on the other side of the table or platform 1318, to allow for additional lining time of the can ends.

When a lid or can end leaves a starwheel 1520*a* or 1520*b*, the can end is in a down position. The starwheel 1520*a* or 1520*b* rotates the lid around to meet a lower chuck 1324. Specifically, each turret 1306*a* and 1306*b* includes a plurality of lower chucks 1324 each configured to receive a lid, rotate the lid around the turret 1306*a* and 1306*b* and rotate the lid as the sealing compound is applied to the lid. The lower chucks 1324 pick up the lid, and a lift cam 1326*a* and 1326*b* lifts the lower chuck 1324 to a workstation 1316 on the turret system 1302*a* and 1302*b*. The lift cam 1324 includes a cam ring 1350 and each lower chuck 1324 includes a plurality of wheels 1352 attached to each lower chuck 1324 and configured to interface with the cam ring 1350. The cam ring 1350 is sized and shaped to raise each lower chuck 1324 when the lower chuck 1324 receives a lid such that the lid is positioned proximate a nozzle 1322 to receive sealing compound. Additionally, the cam ring 1350 is sized and shaped to lower each lower chuck 1324 when the lower chuck 1324 unloads a lid to an exit chute (see, e.g., exit chute 1212*a* and 1212*b* in FIG. 12). In the illustrated embodiment, the cam ring 1350 includes a race (not shown) that has a variable height relative to the table or platform surface 1318. The wheels 1352 roll on the race and change the height of the lower chucks 1324 as the lower chucks 1324 rotate around the turret 1306*a* and 1306*b*.

When the lift cam 1326 is in the up position, rising above the platform 1318 to the applicator 1314, the lid is rotated approximately 150° in the upright position, as the sealant is applied to the lid. In the disclosed technology, as a result of the locations of each downstacker, each lift cam 1326 is elongated. The longer length of the lift cam 1326 allows for the lid or can end to be on the lift cam 1326 longer, thus, allowing for more sealant application time. In other liner machine technology, lift cams are approximately 125° in duration (of a 360° rotation) in the upright position (not accounting for the up ramp and down ramp distance). In the disclosed technology, the lift cams 1326 are approximately 150° degrees because of the distance from a downstacker 1304*a* and 1304*b* to the exit chute 1212*a* and 1212*b*.

Moreover, the longer length of the lift cam 1326 enables the turret systems 1302*a* and 1302*b* to rotate at a higher rate. Specifically, some can end machines only rotate at 150 rotations per minute (rpm). In contrast, the longer length of the lift cam 1326 enables the turret systems 1302*a* and 1302*b* described herein to rotate at 250 rpm, enabling the turret systems 1302*a* and 1302*b* to process more can ends or lids 1290. Additionally, the longer length of the lift cam 1326 also enables the lid or can end 1290 to be rotated about the lower chuck 1324 three times as the lid or can end 1290 is rotated about the lift cam 1326. Rotating the lid or can end 1290 three times about the lower chuck 1324 also enables more sealant to be applied to the lid or can end 1290. In contrast, at least some known can end machines only rotate the can end or lid once or twice. Thus, the longer length of the lift cam 1326 enables more sealant to be applied to the can end or lid 1290 and enables the turret systems 1302*a* and 1302*b* to process more can ends or lids 1290.

Figure 14:
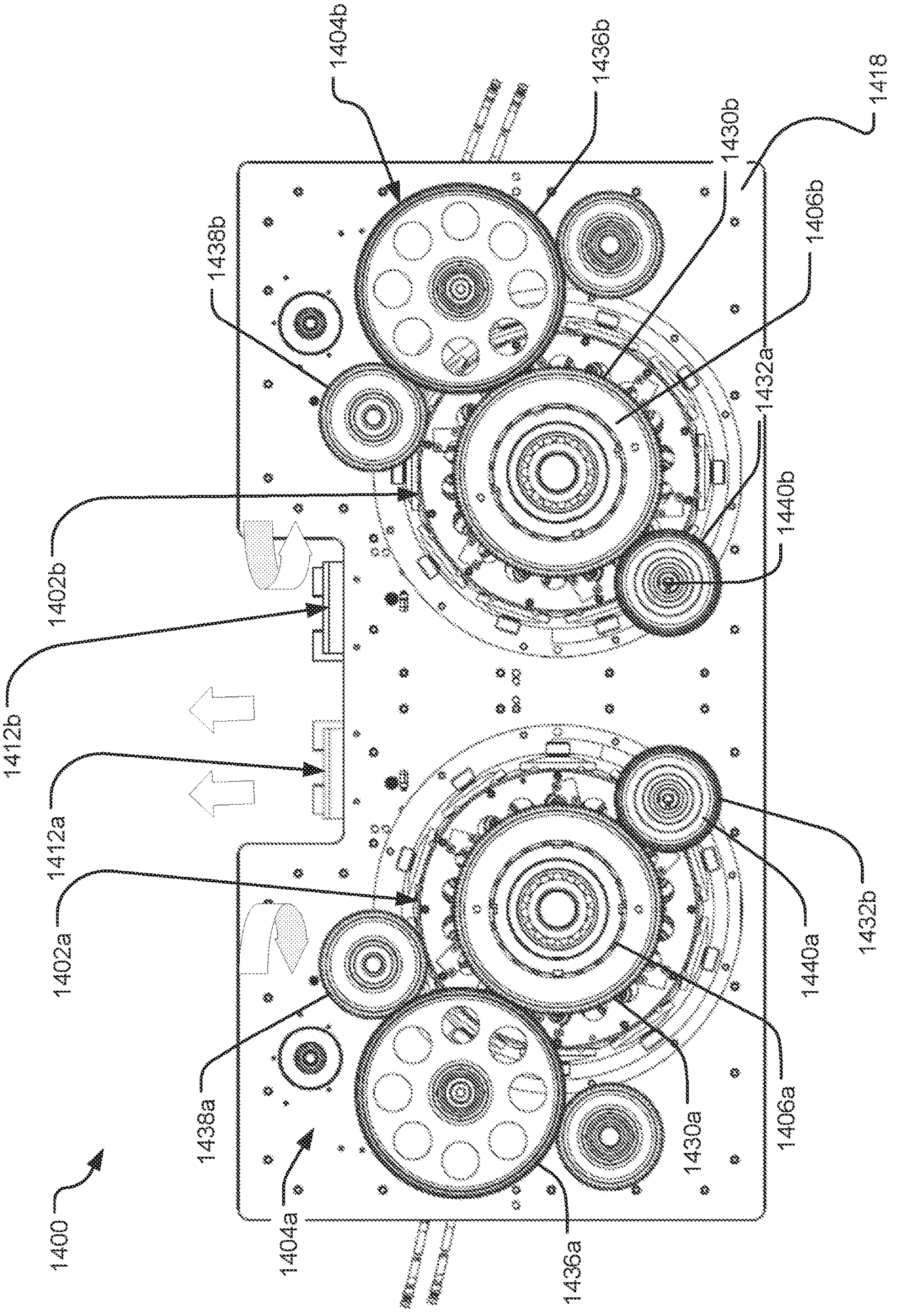
FIG. 14 illustrates an example of a turret liner machine system in accordance with aspects of the present disclosure.

FIG. 14 illustrates an example of a turret liner machine system 1400 in accordance with aspects of the present disclosure. Specifically, FIG. 14 is a bottom view of an asynchronized dual turret liner machine system 1400 for applying a sealing compound (not shown) to a can end or lid 1290 (shown in FIG. 12). The dual turret liner machine 1400 applies a sealant to metal lids, each metal lid being received from a supply conveyor (not shown) and discharged to a discharge conveyor (not shown) via an exit chute 1412*a* and 1412*b*. The dual turret liner machine 1400 includes two turret systems 1402*a* and 1402*b* driven by two main drive motors 1440*a* and 1440*b*. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1402*a* and 1402*b* may be referred to herein as systems including a turret 1406*a* and 1406*b*, a plurality of workstations (see. e.g., workstations 1116, 1216, and 1316 in FIGS. 11-13), and applicators (see. e.g., applicators 1114, 1214, and 1314 in FIGS. 11-13) with nozzles (see. e.g., applicators 1122, 1222, and 1322 in FIGS. 11-13) for sealant application. Each turret system 1402*a* and 1402*b* may be adapted to receive lids from a starwheel (see. e.g., starwheels 1520*a* and 1520*b* in FIG. 15) which is adapted to receive the lids from a downstacker (e.g., downstackers 1404*a* and 1404*b*). The turret systems 1402*a* and 1402*b* may be installed at the top of a table or platform surface 1418 and rotate in opposition directions from one another (as depicted by the arrows). The turret systems 1402*a* and 1402*b* each include a plurality of workstations (see. e.g., workstations 1116, 1216, and 1316 in FIGS. 11-13) which extend out from each turret system facing away from each other.

The workstations receive an individual lid from a downstacker 1404*a* and 1404*b*. In the dual turret system 1400, there are two downstackers 1404*a* and 1404*b*, each downstacker 1404*a* and 1404*b* connected to each turret system 1402*a* and 1402*b*. The starwheels 1520*a* and 1520*b* adapted to deliver lids from each downstacker 1404*a* and 1404*b* to each turret are rotatable in an opposite direction from its respective turret, and in an opposite direction from the other starwheel 1520*b* or 1520*a*. Sealant injectors or applications may be installed in the workstations to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1404*a* and 1404*b* are located at the outer corner edges of the liner machine system, at approximately ±45° from the center axis of the turret, rather than directly opposite the exit chutes on the other side of the table or platform, to allow for additional lining time of the can ends.

The turrets 1406*a* and 1406*b* each include a turret gear 1430*a* and 1430*b*, the main drive motors 1440*a* and 1440*b* each include a main drive gear 1432*a* and 1432*b*, the starwheels 1520*a* or 1520*b* each include a starwheel gear 1436*a* and 1436*b*, and the lower chucks 1324 each include a lower chuck gear 1438*a* and 1438*b*. The turret gears 1430*a* and 1430*b* are configured to rotate the turrets 1406*a* and 1406*b*, the starwheel gears 1436*a* and 1436*b* are configured to rotate the starwheels 1520*a* or 1520*b*, and the lower chuck gears 1438*a* and 1438*b* are configured to rotate the lower chucks 1324. In the illustrated embodiment, the main drive gears 1432*a* and 1432*b* are rotatably coupled to the turret gears 1430*a* and 1430*b* respectively. The turret gears 1430*a* and 1430*b* are rotatably coupled to the starwheel gear 1436*a* and 1436*b* respectively. In the illustrated embodiment, the lower chuck gear 1438*a* and 1438*b* are independently driven by a chuck gear motor (not shown). In alternative embodiments, the lower chuck gear 1438*a* and 1438*b* may be driven by the turret gears 1430*a* and 1430*b*, the starwheel gears 1436*a* and 1436*b*, and/or the main drive gears 1432*a* and 1432*b*.

During operations, the main drive motors 1440*a* and 1440*b* rotate the 1432*a* and 1432*b* which rotate the turret gears 1430*a* and 1430*b* respectively. The turret gears 1430*a* and 1430*b* rotate the turrets 1406*a* and 1406*b* and the starwheel gears 1436*a* and 1436*b* respectfully. The starwheel gears 1436*a* and 1436*b* rotate the starwheels 1520*a* and 1520*b*. Accordingly, in the illustrated embodiment, the turret gears 1430*a* and 1430*b*, the main drive gear 1432*a* and 1432*b*, the starwheel gears 1436*a* and 1436*b*, and the lower chuck gears 1438*a* and 1438*b* are arranged to drive both turret systems 1402*a* and 1402*b* with two main drive motors 1440*a* and 1440*b*, increasing production time, increasing profits, and reducing the overall footprint of the turret liner machine system 1400.

Figure 15:
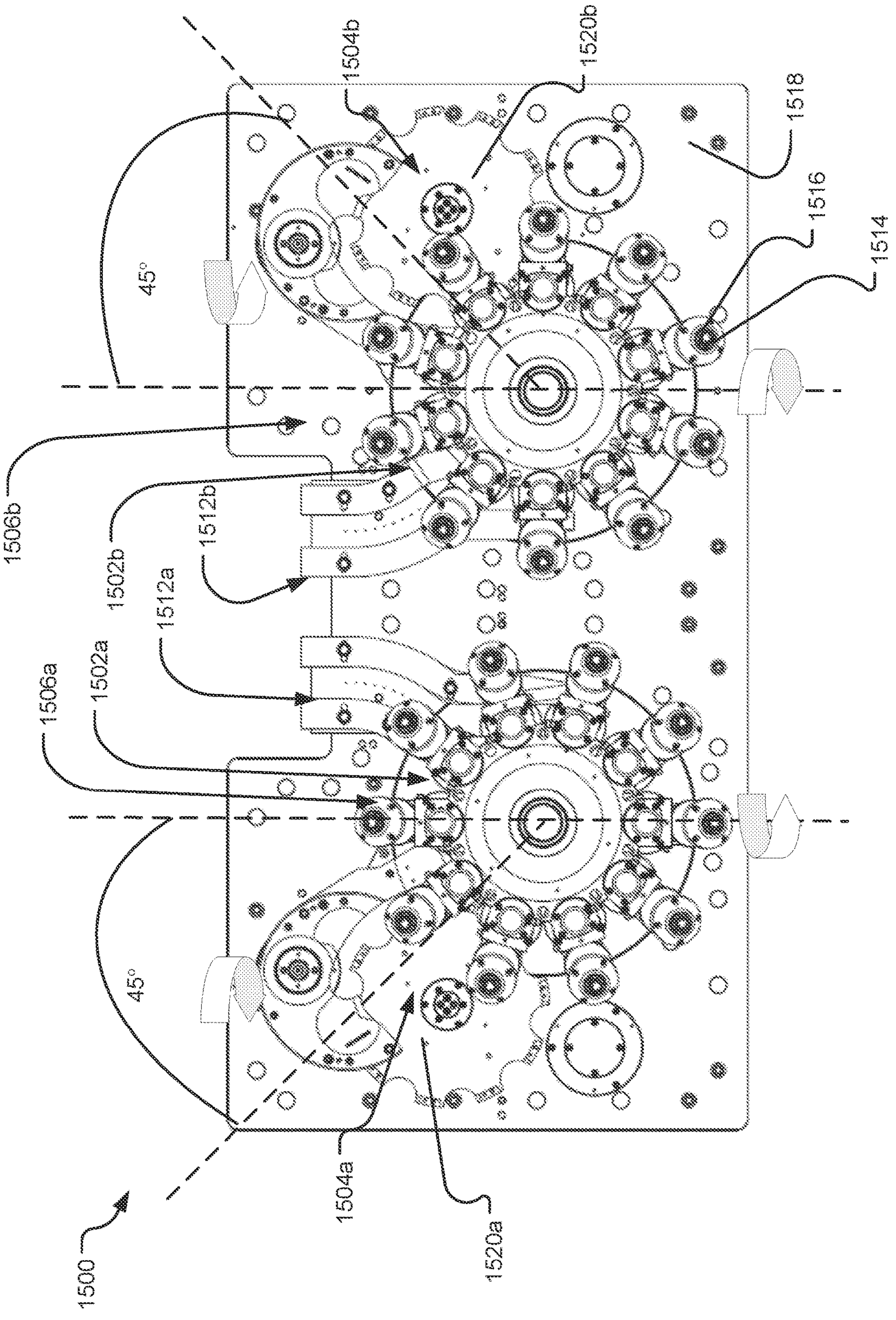
FIG. 15 illustrates an example of a turret liner machine system in accordance with aspects of the present disclosure.

FIG. 15 illustrates an example of a turret liner machine system 1500 in accordance with aspects of the present disclosure. Specifically, FIG. 15 is a top view of an asynchronized dual turret liner machine system 1500 for applying a sealing compound to a can end or lid 1290 (shown in FIG. 12). The dual turret liner machine 1500 applies a sealant to metal lids, each metal lid being received from a supply conveyor (not shown) and discharged to a discharge conveyor (not shown) via an exit chute 1512. The dual turret liner machine 1500 includes two turret systems 1502*a* and 1502*b* driven by two main drive motors (see, e.g., main drive motor 1440*a* and 1440*b* in FIG. 14). In some implementations, the liner machine technology may incorporate any number of turrets, drives, motors, chucks, chuck drives, downstackers, and starwheels. The disclosed technology is aimed at performing high speed and high-volume end production with scalable systems.

FIGS. 15-20 illustrates an example of an asynchronized or independent turret liner machine system in accordance with aspects of the present disclosure. Specifically, FIGS. 15-20 illustrate an independent turret liner machine system. Independent turret systems are configured where the first turret and its respective starwheel operate independently from the second turret. For example, the first turret and its respective starwheel may be operating while the second turret and its respective starwheel do not operate. This independent operation allows for access, downtime, and maintenance to one of the turrets and its respective system. In another example, the first turret and its respective starwheel may be operating while the second turret and its respective starwheel operate, yet each turret has the capability of operating or not operating when the other turret is operating. The advantages of independent turret liner machine systems are that one system if one system fails or is m turned off for maintenance, the other system may operate, resulting in less time and money lost.

The turret systems 1502*a* and 1502*b* may be referred to herein as systems including a turret 1506*a* and 1506*b*, a plurality of workstations 1516, and applicators 1514 with nozzles (see, e.g., nozzles 1122 in FIG. 11) for sealant application. Each turret system 1502*a* and 1502*b* may be adapted to receive lids from a starwheel 1520*a* and 1520*b* which is adapted to receive the lids from a downstacker 1504*a* and 1504*b*). The turret systems 1502*a* and 1502*b* may be installed at the top of a table or platform surface 1518 and rotate in opposition directions from one another (as depicted by the arrows). The turret systems 1502*a* and 1502*b* each include a plurality of workstations 1516 which extend out from each turret system facing away from each other.

The workstations 1516 receive an individual lid (not shown) from a downstacker 1504*a* and 1504*b*. In the dual turret system 1500, there are two downstackers 1504*a* and 1504*b*, each downstacker 1504*a* and 1504*b* connected to each turret system 1502*a* and 1502*b*. The starwheels 1520*a* and 1520*b* adapted to deliver lids from each downstacker to each turret 1506*a* and 1506*b* is rotatable in an opposite direction from its respective turret 1506*a* and 1506*b*, and in an opposite direction from the other starwheel 1520*b* or 1520*a*. Sealant injectors or applications 1514 may be installed in the workstations 1516 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1504*a* and 1504*b* are located at the outer corner edges of the liner machine system, at approximately ±45° from the center axis of the turret (as depicted with the arrows and axis line), rather than directly opposite the exit chutes 1512*a* and 1512*b* on the other side of the table or platform, to allow for additional lining time of the can ends.

As shown in FIG. 15, the turret liner machine system 1500 includes two turret systems 1502*a* and 1502*b* operating in a single machine. The two turret systems 1502*a* and 1502*b* share a plurality of auxiliary systems that enable the turret liner machine system 1500 to reduce complexity, reduce auxiliary systems, and reduce the overall footprint of the turret liner machine system 1500. For example, the turret liner machine system 1500 may include an electrical system (not shown), a compressed air system (not shown), an air cooler (not shown), an oil cooling system (not shown) including an oil cavity (not shown), and a feed of sealant (not shown). The arrangement of two turret systems 1502*a* and 1502*b* operating in a single machine enables the two turret systems 1502*a* and 1502*b* to share the auxiliary systems, reducing complexity, reducing auxiliary systems, and reducing the overall footprint of the turret liner machine system 1500.

Figure 16:
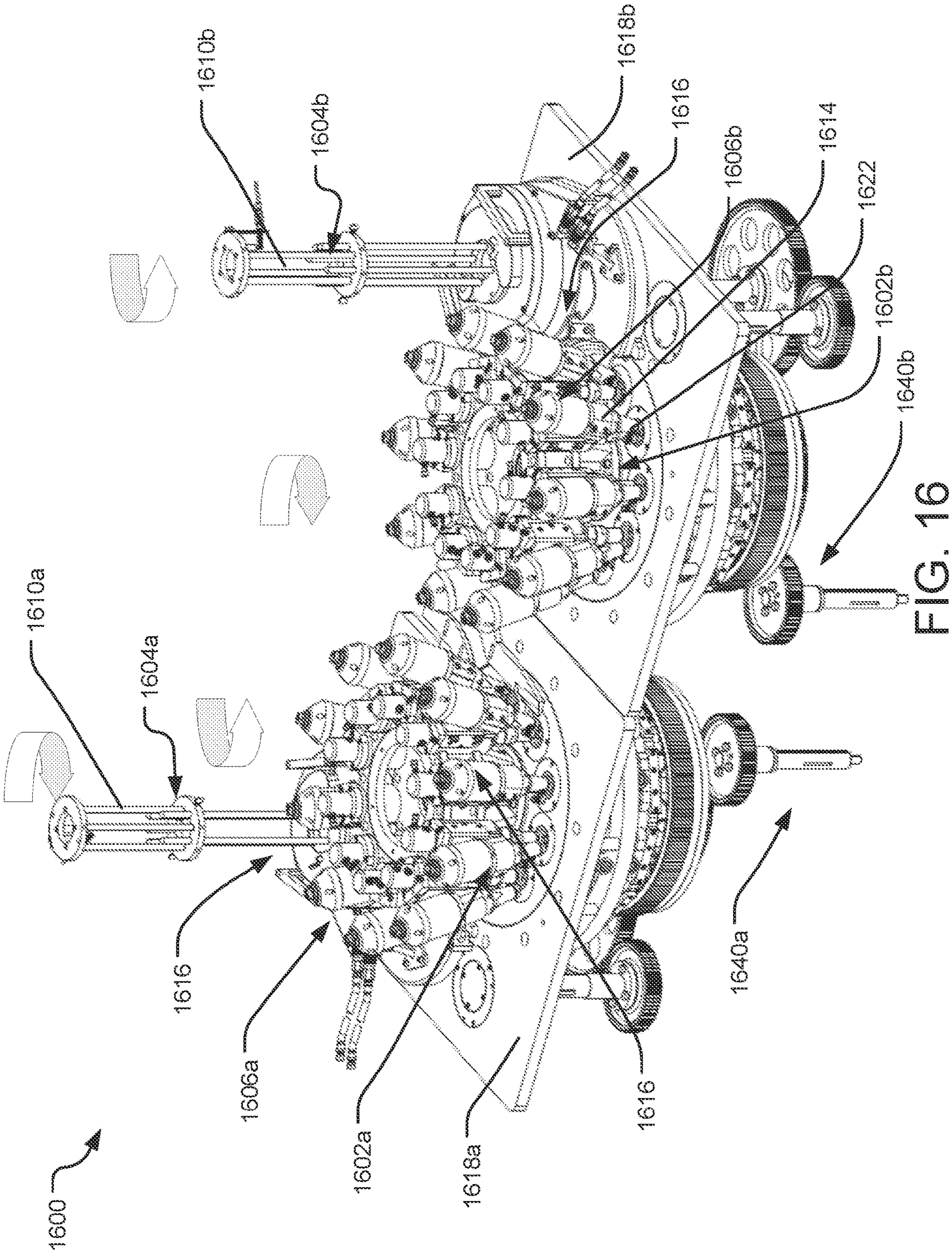
FIG. 16 illustrates an example of a turret liner machine system in accordance with aspects of the present disclosure.

FIG. 16 illustrates an example of a turret liner machine system 1600 in accordance with aspects of the present disclosure. Specifically, FIG. 16 is a perspective view of an asynchronized dual turret liner machine system 1600 for applying a sealing compound to a can end or lid 1790 (shown in FIG. 17). The asynchronized dual turret liner machine 1600 applies a sealant (not shown) to metal lids, each metal lid being received from a supply conveyor (not shown) and discharged to a discharge conveyor (not shown) via an exit chute (see, e.g., exit chute 1712*a* and 1712*b* in FIG. 17). In the illustrated embodiment, the dual turret liner machine 1600 includes two turret systems 1602*a* and 1602*b* driven by two independent main drive motors 1640*a* and 1640*b*. The main drive motors 1640*a* and 1640*b* are located proximate to the respective turret systems and may be configured to operate independently of each other to ensure that if one of the turret systems requires maintenance or breaks down, the other turret system can continue to operate, increasing production time and increasing profits. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1602*a* and 1602*b* may be referred to herein as systems including a turret 1606*a* and 1606*b*, a plurality of workstations 1616, and applicators 1614 with nozzles 1622 for sealant application. Each turret system may be adapted to receive lids from a starwheel (see. e.g., starwheels 2020*a* and 2020*b* in FIG. 20) which is adapted to receive the lids from a downstacker (e.g., downstackers 1604*a* and 1604*b*). The turret systems 1602*a* and 1602*b* may be installed at the top of a table or platform surface 1618*a* and 1618*b* and rotate in opposition directions from one another (as depicted by the arrows). In the illustrated embodiment, the tables or platform surfaces 1618*a* and 1618*b* are separate to enable the turret systems 1602*a* and 1602*b* to be separately maintained or repaired such that if one of the turret systems requires maintenance or breaks down, the other turret system can continue to operate, increasing production time and increasing profits. The turret systems 1602*a* and 1602*b* each include a plurality of workstations 1616 which extend out from each turret system facing away from each other.

The workstations 1616 receive an individual lid from a downstacker. In the dual turret system 1600, there are two downstackers 1604*a* and 1604*b*, each downstacker connected to each turret system 1602*a* and 1602*b*. The starwheels 2020*a* and 2020*b* adapted to deliver lids from each downstacker to each turret are rotatable in an opposite direction from its respective turret, and in an opposite direction from the other starwheel 2020*b* or 2020*a*. Sealant injectors or applications 1614 may be installed in the workstations to apply sealant to each metal lid as the lids rotate around each turret 1606*a* and 1606*b*.

As shown in FIG. 16, a rod cage 1610*a* and 1610*b* is attached to each downstacker 1604*a* and 1604*b*. In some implementations, a rod cage 1610*a* and 1610*b* may not be used and a belt (not shown) or conveyor (not shown) feeds can ends directly into the machine.

When applying sealant to a can end or container closure member, it may be desirable to closely control the lining time of the can ends. It may be beneficial to maximize the application time of sealant on can ends in order to ensure comprehensive coverage. In the disclosed technology, the downstackers are located at the outer corner edges of the liner machine system, at approximately ±45° from the center axis of the turret 1606*a* and 1606*b* (as shown in more detail in FIG. 17, depicted with the arrows and axis line), rather than directly opposite the exit chutes (see, e.g., exit chute 1712*a* and 1712*b* in FIG. 17) on the other side of the table or platform, to allow for additional lining time of the can ends.

Figure 17:
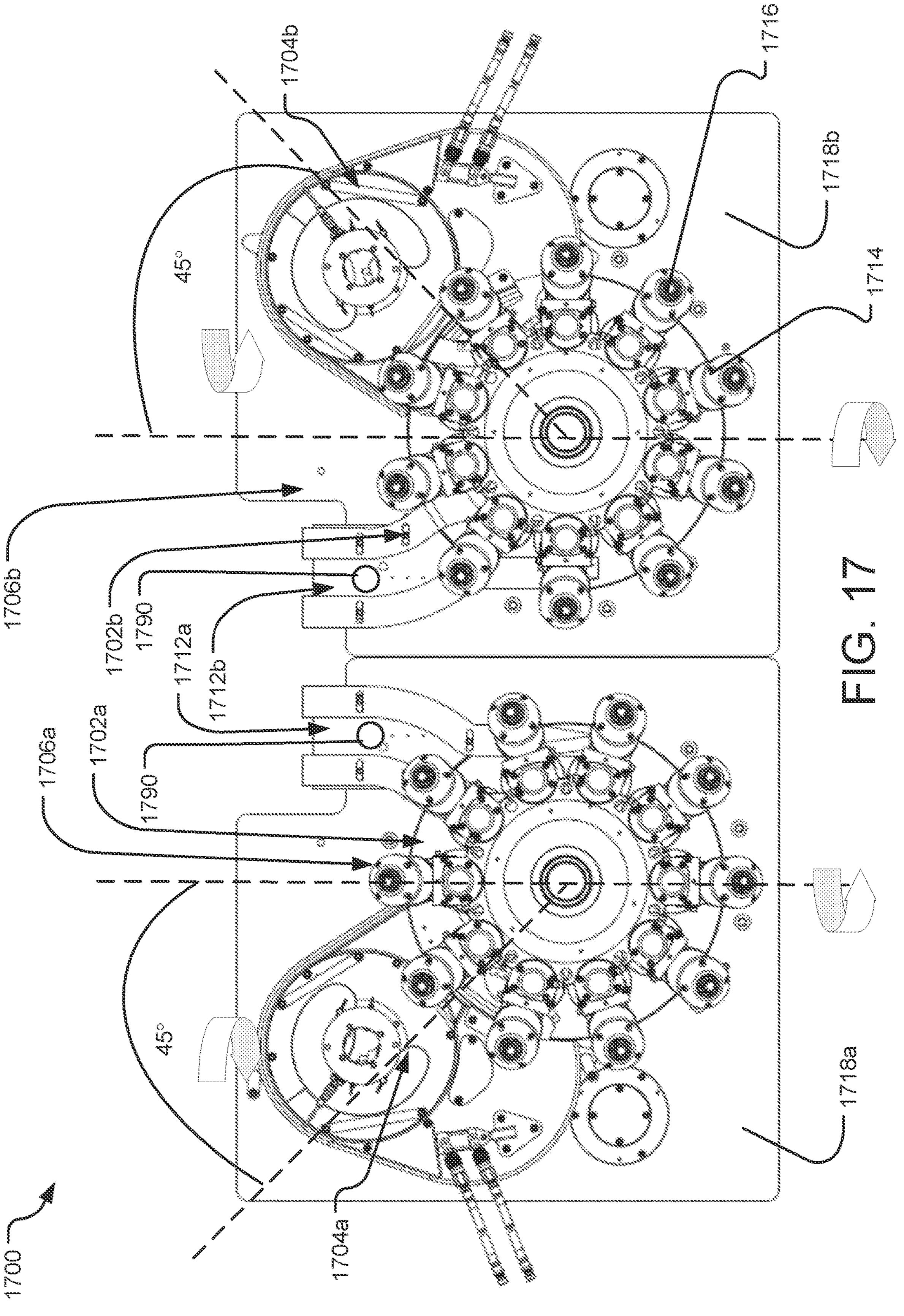
FIG. 17 illustrates an example of a turret liner machine system in accordance with aspects of the present disclosure.

FIG. 17 illustrates an example of a turret liner machine system 1700 in accordance with aspects of the present disclosure. Specifically, FIG. 17 is a top view of an asynchronized dual turret liner machine system 1700 for applying a sealing compound to a can end or lid 1790. The dual turret liner machine 1700 applies a sealant to metal lids, each metal lid being received from a supply conveyor (not shown) and discharged to a discharge conveyor (not shown) via an exit chute 1712*a* and 1712*b*. The dual turret liner machine 1700 includes two turret systems 1702*a* and 1702*b* driven by tow main drive motors (see, e g, main drive motors 1640*a* and 1640*b* in FIG. 16). In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1702*a* and 1702*b* may be referred to herein as systems including a turret 1706*a* and 1706*b*, a plurality of workstations 1716, and applicators 1714 with nozzles (see, e.g., nozzles 1622 in FIG. 16) for sealant application. Each turret system 1702*a* and 1702*b* may be adapted to receive lids from a starwheel (see. e.g., starwheels 2020*a* and 2020*b* in FIG. 20) which is adapted to receive the lids from a downstacker 1704*a* and 1704*b*. The turret systems 1702*a* and 1702*b* may be installed at the top of a table or platform surface 1718*a* and 1782*b* and rotate in opposition directions from one another (as depicted by the arrows). The turret systems 1702*a* and 1702*b* each include a plurality of workstations 1716 which extend out from each turret system facing away from each other.

The workstations 1716 receive an individual lid (not shown) from a downstacker 1704*a* and 1704*b*. In the dual turret system 1700, there are two downstackers 1704*a* and 1704*b*, each downstacker 1704*a* and 1704*b* connected to each turret system 1702*a* and 1702*b*. The starwheels 2020*a* and 2020*b* adapted to deliver lids from each downstacker to each turret 1706*a* and 1706*b* are rotatable in an opposite direction from its respective turret 1706*a* and 1706*b*, and in an opposite direction from the other starwheel 2020*b* or 2020*a*. Sealant injectors or applications 1714 may be installed in the workstations 1716 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1704*a* and 1704*b* are located at the outer corner edges of the liner machine system, at approximately ±45° from the center axis of the turret (as depicted with the arrows and axis line), rather than directly opposite the exit chutes 1712*a* and 1712*b* on the other side of the table or platform, to allow for additional lining time of the can ends.

Figure 18:
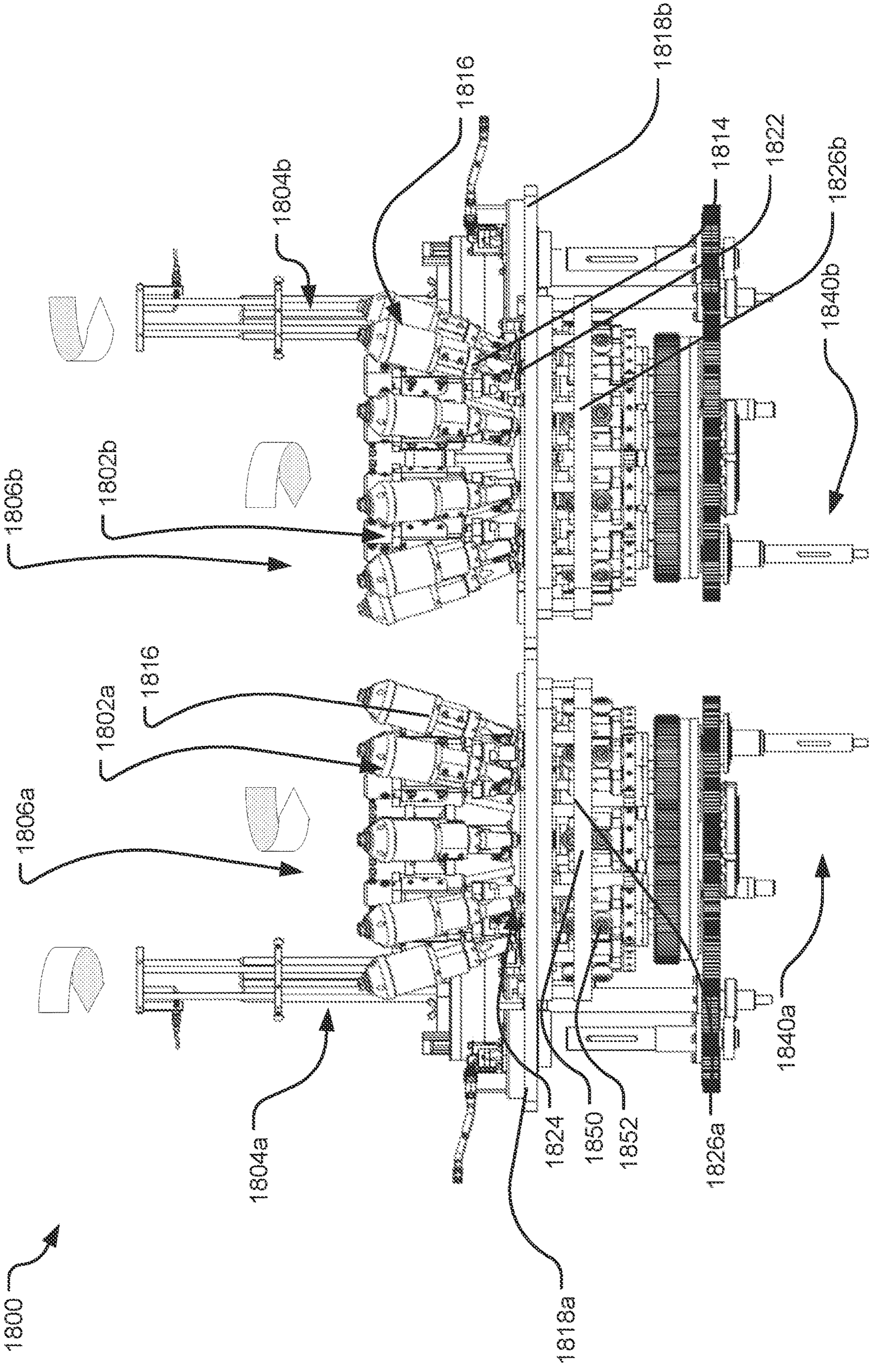
FIG. 18 illustrates an example of a turret liner machine system in accordance with aspects of the present disclosure.

FIG. 18 illustrates an example of a turret liner machine system 1800 in accordance with aspects of the present disclosure. Specifically, FIG. 18 is a side view of an asynchronized dual turret liner machine system 1800 for applying a sealing compound to a can end or lid 1790 (shown in FIG. 17). The dual turret liner machine 1800 applies a sealant to metal lids, each metal lid being received from a supply conveyor (not shown) and discharged to a discharge conveyor (not shown) via an exit chute (see, e.g., exit chute 1712*a* and 1712*b* in FIG. 17). The dual turret liner machine 1800 includes two turret systems 1802*a* and 1802*b* driven by two main drive motors 1840*a* and 1840*b*. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1802*a* and 1802*b* may be referred to herein as systems including a turret 1806*a* and 1806*b*, a plurality of workstations 1816, and applicators 1814 with nozzles 1822 for sealant application. Each turret system 1802*a* and 1802*b* may be adapted to receive lids from a starwheel (see. e.g., starwheels 2020*a* and 2020*b* in FIG. 20) which is adapted to receive the lids from a downstacker 1804*a* and 1804*b*. The turret systems 1802*a* and 1802*b* may be installed at the top of a table or platform surface 1818*a* and 1818*b* and rotate in opposition directions from one another (as depicted by the arrows). The turret systems 1802*a* and 1802*b* each include a plurality of workstations 1816 which extend out from each turret system facing away from each other.

The workstations 1816 receive an individual lid from a downstacker 1804*a* and 1804*b*. In the dual turret system 1800, there are two downstackers 1804*a* and 1804*b*, each downstacker 1804*a* and 1804*b* connected to each turret system 1802*a* and 1802*b*. The starwheels 2020*a* or 2020*b* adapted to deliver lids from each downstacker 1804*a* and 1804*b* to each turret 1806*a* and 1806*b* are rotatable in an opposite direction from its respective turret 1806*a* and 1806*b*, and in an opposite direction from the other starwheel 2020*b* or 2020*a*. Sealant injectors or applications 1814 may be installed in the workstations 1816 to apply sealant to each metal lid as the lids rotate around each turret 1806*a* and 1806*b*.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1804*a* and 1804*b* are located at the outer corner edges of the liner machine system, at approximately ±45° from the center axis of the turret, rather than directly opposite the exit chutes on the other side of the table or platform 1818*a* and 1818*b*, to allow for additional lining time of the can ends.

When a lid or can end leaves a starwheel 2020*a* or 2020*b*, the can end is in a down position. The starwheel 2020*a* or 2020*b* rotates the lid around to meet a lower chuck 1824. Specifically, each turret 1806*a* and 1806*b* includes a plurality of lower chucks 1824 each configured to receive a lid, rotate the lid around the turret 1806*a* and 1806*b* and rotate the lid as the sealing compound is applied to the lid. The lower chucks 1824 pick up the lid, and a lift cam 1826*a* and 1826*b* lifts the lower chuck 1824 to a workstation 1816 on the turret system 1802*a* and 1802*b*. The lift cam 1824 includes a cam ring 1850 and each lower chuck 1824 includes a plurality of wheels 1852 attached to each lower chuck 1824 and configured to interface with the cam ring 1850. The cam ring 1850 is sized and shaped to raise each lower chuck 1824 when the lower chuck 1824 receives a lid such that the lid is positioned proximate a nozzle 1822 to receive sealing compound. Additionally, the cam ring 1850 is sized and shaped to lower each lower chuck 1824 when the lower chuck 1824 unloads a lid to an exit chute (see, e.g., exit chute 1712*a* and 1712*b* in FIG. 17). In the illustrated embodiment, the cam ring 1850 includes a race (not shown) that has a variable height relative to the table or platform surface 1818*a* and 1818*b*. The wheels 1852 roll on the race and change the height of the lower chucks 1824 as the lower chucks 1824 rotate around the turret 1806*a* and 1806*b*.

When the lift cam 1826 is in the up position, rising above the platform 1818*a* and 1818*b* to the applicator 1814, the lid is rotated approximately 150° in the upright position, as the sealant is applied to the lid. In the disclosed technology, as a result of the locations of each downstacker, each lift cam 1826 is longer. The longer length of the lift cam 1826 allows for the lid or can end to be on the lift cam 1826 longer, thus, allowing for more sealant application time. In other liner machine technology, lift cams are approximately 125° in duration (of a 360° rotation) in the upright position (not accounting for the up ramp and down ramp distance). In the disclosed technology, the lift cams 1826 are approximately 150° degrees because of the distance from a downstacker 1804*a* and 1804*b* to the exit chute 1712*a* and 1712*b*.

Moreover, the longer length of the lift cam 1826 enables the turret systems 1802*a* and 1802*b* to rotate at a higher rate. Specifically, some can end machines only rotate at 150 rotations per minute (rpm). In contrast, the longer length of the lift cam 1826 enables the turret systems 1802*a* and 1802*b* described herein to rotate at 250 rpm, enabling the turret systems 1802*a* and 1802*b* to process more can ends or lids 1790. Additionally, the longer length of the lift cam 1826 also enables the lid or can end 1790 to be rotated about the lower chuck 1824 three times as the lid or can end 1790 is rotated about the lift cam 1826. Rotating the lid or can end 1790 three times about the lower chuck 1824 also enables more sealant to be applied to the lid or can end 1790. In contrast, at least some known can end machines only rotate the can end or lid once or twice. Thus, the longer length of the lift cam 1826 enables more sealant to be applied to the can end or lid 1790 and enables the turret systems 1802*a* and 1802*b* to process more can ends or lids 1790.

Figure 19:
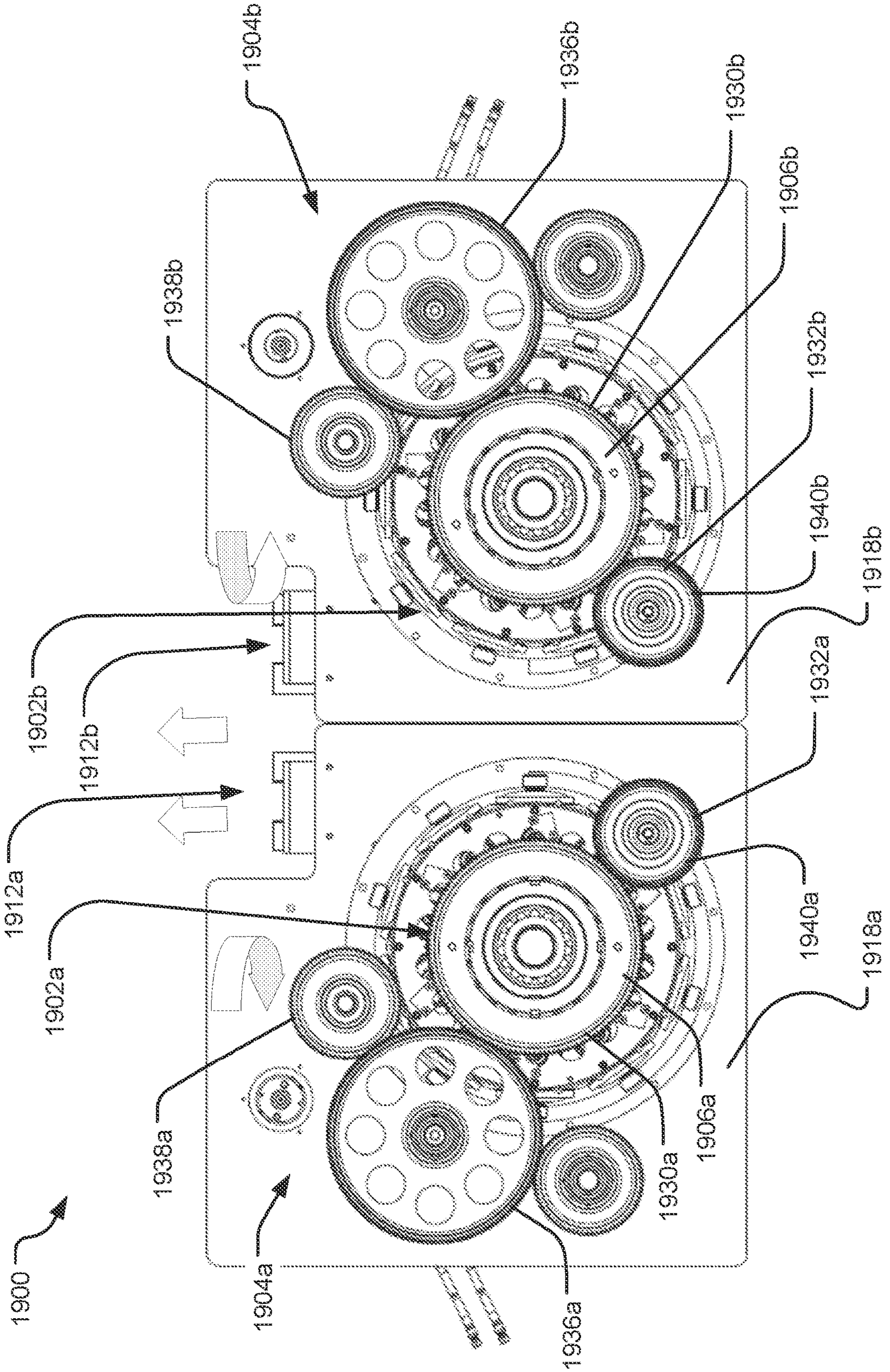
FIG. 19 illustrates an example of a turret liner machine system in accordance with aspects of the present disclosure.

FIG. 19 illustrates an example of a turret liner machine system 1900 in accordance with aspects of the present disclosure. Specifically, FIG. 19 is a bottom view of an asynchronized dual turret liner machine system 1900 for applying a sealing compound (not shown) to a can end or lid 1790 (shown in FIG. 17). The dual turret liner machine 1900 applies a sealant to metal lids, each metal lid being received from a supply conveyor (not shown) and discharged to a discharge conveyor (not shown) via an exit chute 1912*a* and 1912*b*. The dual turret liner machine 1900 includes two turret systems 1902*a* and 1902*b* driven by two main drive motors 1940*a* and 1940*b*. In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 1902*a* and 1902*b* may be referred to herein as systems including a turret 1906*a* and 1906*b*, a plurality of workstations (see. e.g., workstations 1616, 1716, and 1816 in FIGS. 16-18), and applicators (see. e.g., applicators 1614, 1714, and 1814 in FIGS. 16-18) with nozzles (see. e.g., applicators 1622, 1722, and 1822 in FIGS. 16-18) for sealant application. Each turret system 1902*a* and 1902*b* may be adapted to receive lids from a starwheel (see. e.g., starwheels 2020*a* and 2020*b* in FIG. 20) which is adapted to receive the lids from a downstacker (e.g., downstackers 1904*a* and 1904*b*). The turret systems 1902*a* and 1902*b* may be installed at the top of a table or platform surface 1918*a* and 1918*b* and rotate in opposition directions from one another (as depicted by the arrows). The turret systems 1902*a* and 1902*b* each include a plurality of workstations (see. e.g., workstations 1616, 1716, and 1816 in FIGS. 16-18) which extend out from each turret system facing away from each other.

The workstations receive an individual lid from a downstacker 1904*a* and 1904*b*. In the dual turret system 1900, there are two downstackers 1904*a* and 1904*b*, each downstacker 1904*a* and 1904*b* connected to each turret system 1902*a* and 1902*b*. The starwheels 2020*a* and 2020*b* adapted to deliver lids from each downstacker 1904*a* and 1904*b* to each turret are rotatable in an opposite direction from its respective turret, and in an opposite direction from the other starwheel 2020*b* or 2020*a*. Sealant injectors or applications may be installed in the workstations to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 1904*a* and 1904*b* are located at the outer corner edges of the liner machine system, at approximately ±45° from the center axis of the turret, rather than directly opposite the exit chutes on the other side of the table or platform, to allow for additional lining time of the can ends.

The turrets 1906*a* and 1906*b* each include a turret gear 1930*a* and 1930*b*, the main drive motors 1940*a* and 1940*b* each include a main drive gear 1932*a* and 1932*b*, the starwheels 2020*a* or 2020*b* each include a starwheel gear 1936*a* and 1936*b*, and the lower chucks 1824 each include a lower chuck gear 1938*a* and 1938*b*. The turret gears 1930*a* and 1930*b* are configured to rotate the turrets 1906*a* and 1906*b*, the starwheel gears 1936*a* and 1936*b* are configured to rotate the starwheels 2020*a* or 2020*b*, and the lower chuck gears 1938*a* and 1938*b* are configured to rotate the lower chucks 1824. In the illustrated embodiment, the main drive gears 1932*a* and 1932*b* are rotatably coupled to the turret gears 1930*a* and 1930*b* respectively. The turret gears 1930*a* and 1930*b* are rotatably coupled to the starwheel gear 1936*a* and 1936*b* respectively. In the illustrated embodiment, the lower chuck gear 1938*a* and 1938*b* are independently driven by a chuck gear motor (not shown). In alternative embodiments, the lower chuck gear 1938*a* and 1938*b* may be driven by the turret gears 1930*a* and 1930*b*, the starwheel gears 1936*a* and 1936*b*, and/or the main drive gears 1932*a* and 1932*b*.

During operations, the main drive motors 1940*a* and 1940*b* rotate the 1932*a* and 1932*b* which rotate the turret gears 1930*a* and 1930*b* respectively. The turret gears 1930*a* and 1930*b* rotate the turrets 1906*a* and 1906*b* and the starwheel gears 1936*a* and 1936*b* respectfully. The starwheel gears 1936*a* and 1936*b* rotate the starwheels 2020*a* and 2020*b*. Accordingly, in the illustrated embodiment, the turret gears 1930*a* and 1930*b*, the main drive gear 1932*a* and 1932*b*, the starwheel gears 1936*a* and 1936*b*, and the lower chuck gears 1938*a* and 1938*b* are arranged to drive both turret systems 1902*a* and 1902*b* with two main drive motors 1940*a* and 1940*b*, increasing production time, increasing profits, and reducing the overall footprint of the turret liner machine system 1900.

Figure 20:
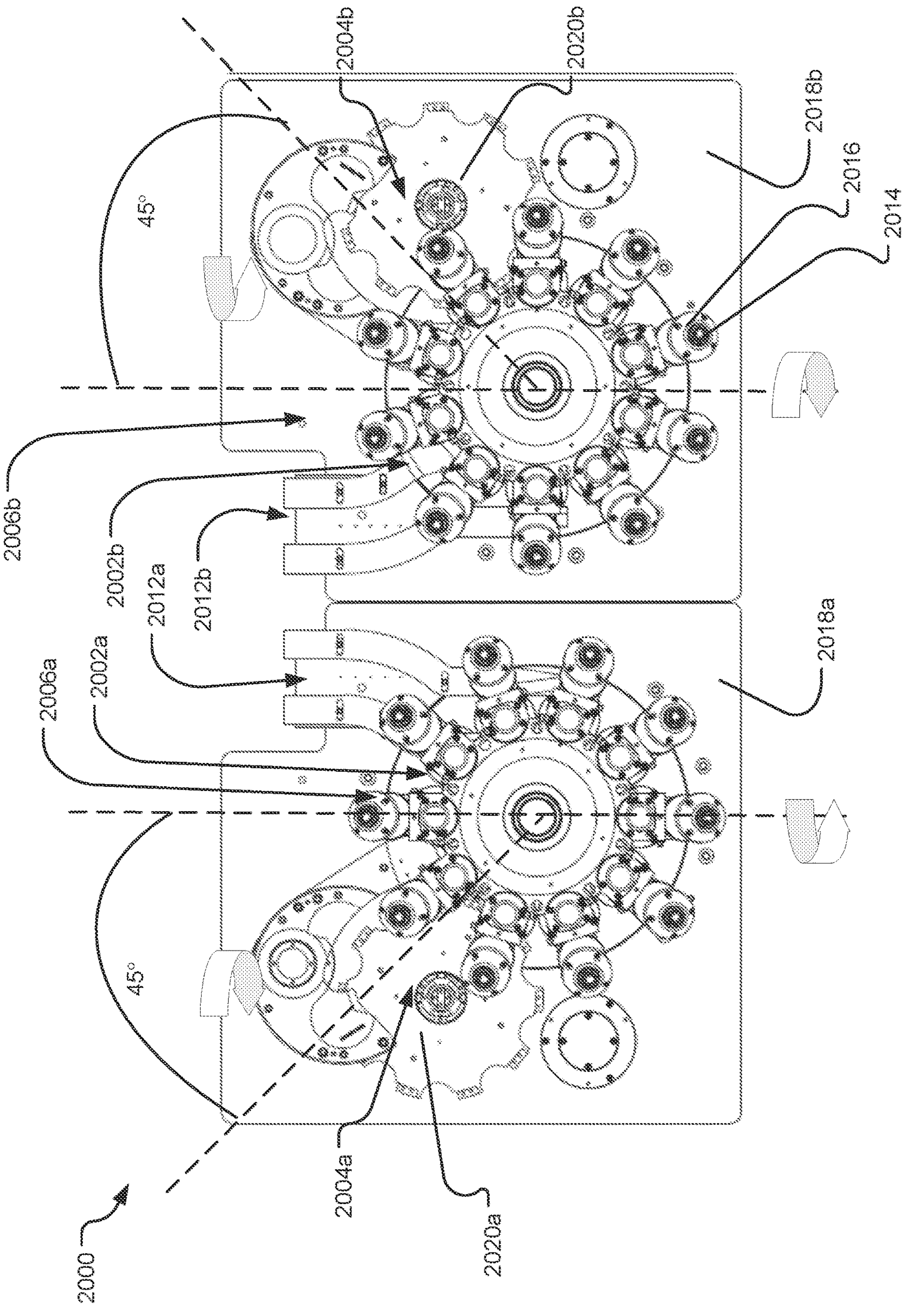
FIG. 20 illustrates an example of a turret liner machine system in accordance with aspects of the present disclosure.

FIG. 20 illustrates an example of a turret liner machine system 2000 in accordance with aspects of the present disclosure. Specifically, FIG. 20 is a top view of an asynchronized dual turret liner machine system 2000 for applying a sealing compound to a can end or lid 1790 (shown in FIG. 17). The dual turret liner machine 2000 applies a sealant to metal lids, each metal lid being received from a supply conveyor (not shown) and discharged to a discharge conveyor (not shown) via an exit chute 2012. The dual turret liner machine 2000 includes two turret systems 2002*a* and 2002*b* driven by two main drive motors (see, e.g., main drive motor 1940*a* and 1940*b* in FIG. 19). In some implementations, the liner machine technology may incorporate any number of turrets, drives, motors, chucks, chuck drives, downstackers, and starwheels. The disclosed technology is aimed at performing high speed and high-volume end production with scalable systems.

The turret systems 2002*a* and 2002*b* may be referred to herein as systems including a turret 2006*a* and 2006*b*, a plurality of workstations 2016, and applicators 2014 with nozzles (see, e.g., nozzles 1622 in FIG. 16) for sealant application. Each turret system 2002*a* and 2002*b* may be adapted to receive lids from a starwheel 2020*a* and 2020*b* which is adapted to receive the lids from a downstacker 2004*a* and 2004*b*). The turret systems 2002*a* and 2002*b* may be installed at the top of a table or platform surface 2018*a* and 2018*b* and rotate in opposition directions from one another (as depicted by the arrows). The turret systems 2002*a* and 2002*b* each include a plurality of workstations 2016 which extend out from each turret system facing away from each other.

The workstations 2016 receive an individual lid (not shown) from a downstacker 2004*a* and 2004*b*. In the dual turret system 2000, there are two downstackers 2004*a* and 2004*b*, each downstacker 2004*a* and 2004*b* connected to each turret system 2002*a* and 2002*b*. The starwheels 2020*a* and 2020*b* adapted to deliver lids from each downstacker to each turret 2006*a* and 2006*b* is rotatable in an opposite direction from its respective turret 2006*a* and 2006*b*, and in an opposite direction from the other starwheel 2020*b* or 2020*a*. Sealant injectors or applications 2014 may be installed in the workstations 2016 to apply sealant to each metal lid as the lids rotate around each turret.

When applying sealant to a can end or container closure member, it may be desirable to closely control the lining time of the can ends. It may be beneficial to maximize the application time of sealant on can ends in order to ensure comprehensive coverage. In the disclosed technology, the downstackers 2004*a* and 2004*b* are located at the outer corner edges of the liner machine system, at approximately ±45° from the center axis of the turret (as depicted with the arrows and axis line), rather than directly opposite the exit chutes 2012*a* and 2012*b* on the other side of the table or platform, to allow for additional lining time of the can ends.

Figure 21:
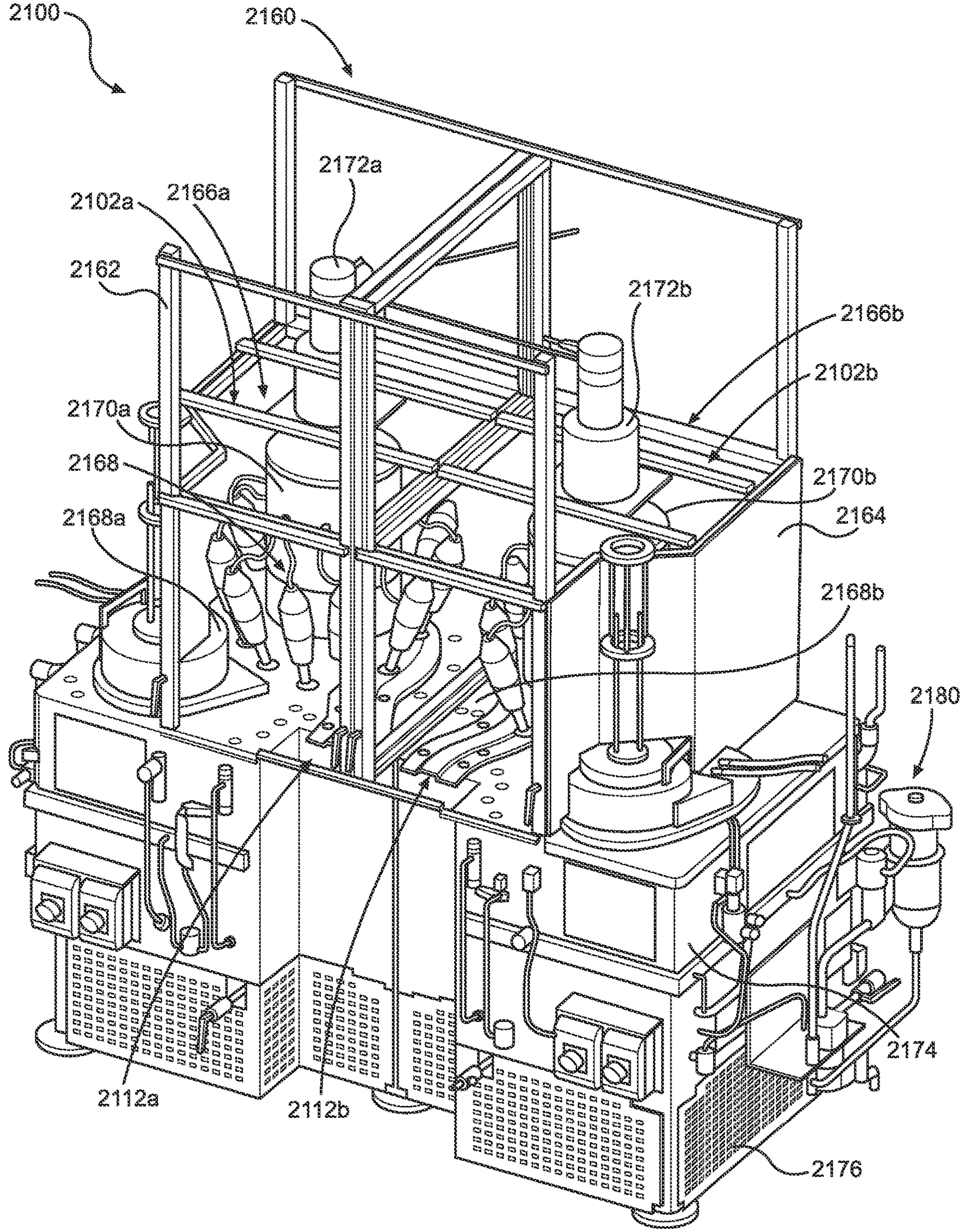
FIG. 21 illustrates an example of a turret liner machine system in accordance with aspects of the present disclosure.

FIG. 21 illustrates an example of a turret liner machine system 2100 in accordance with aspects of the present disclosure. Specifically, FIG. 21 is a perspective view of dual turret liner machine systems 100-2000 for applying a sealing compound to a can end or lid 490, 790, 1290, and 1790 and the turret liner machine system 2100 is illustrative of a super structure 2160 of dual turret liner machine systems 100-2000. The turret liner machine 2100 applies a sealant (not shown) to metal lids, each metal lid being received from a supply conveyor (not shown) and discharged to a discharge conveyor (not shown) via an exit chute (see, e.g., exit chute 2112*a* and 2112*b*). In the illustrated embodiment, the dual turret liner machine 2100 includes two turret systems 2102*a* and 2102*b* driven by two main drive motors (not shown) or a single main drive motors (not shown) as described above. The main drive motor(s) are located proximate to the respective turret systems and may be configured to operate both turret systems 2102*a* and 2102*b*, increasing production time and increasing profits. In some implementations, the liner machine technology may incorporate any number of turrets, drives, motors, chucks, chuck drives, downstackers, and starwheels. The disclosed technology is aimed at performing high speed and high-volume end production with scalable systems.

The super structure 2160 includes a frame 2162, paneling 2164 attached to the frame 2162, a tank system 2166*a* and 2166*b* attached to each turret system 2102*a* and 2102*b*, and at least one door 2168 attached to the frame 2162. The super structure 2160 is attached to a table or platform surface 2118*a* and 2118*b* and is configured to support the tank systems 2166*a* and 2166*b* and protect operators and the turret systems 2102*a* and 2102*b* during use. Specifically, as described above, the turret systems 2102*a* and 2102*b* are configured to rotate at a high rate (i.e., 3,000 rpm) and the super structure 2160 is configured to prevent operators and/or other objects from interfering with that rotation. More specifically, the paneling 2164 and the door 2168 are configured to protect the turret systems 2102*a* and 2102*b* and the operators by preventing operators and/or other objects from interfering with rotation of the turret systems 2102*a* and 2102*b*. In the illustrated embodiment, the super structure 2160 includes four doors 2168*a*, 2168*b*, 2268*c* (shown in FIG. 22), and 2268*d* (shown in FIG. 22). The doors 2168 are configured to enable selective access to the turret systems 2102*a* and 2102*b* when the turret systems 2102*a* and 2102*b* are not operating.

The tank systems 2166*a* and 2166*b* each include a tank 2170*a* and 2170*b* and an attachment mechanism 2172*a* and 2172*b* attached to the tank 2170*a* and 2170*b*. The tanks 2170*a* and 2170*b* are each configured to contain a sealant solution that is applied to the can lids 490, 790, 1290, and 1790 by the turret systems 2102*a* and 2102*b*. Specifically, the tanks 2170*a* and 2170*b* are configured to channel the sealant solution to the nozzles 122-2022 described above for application to the can lids 490, 790, 1290, and 1790. The tanks 2170*a* and 2170*b* are each configured to rotate with their respective turret systems 2102*a* and 2102*b*, and the attachment mechanisms 2172*a* and 2172*b* are configured to attach the tanks 2170*a* and 2170*b* to the frame 2162 to structurally support the tanks 2170*a* and 2170*b*. The attachment mechanisms 2172*a* and 2172*b* remain stationary and are configured to support the tanks 2170*a* and 2170*b* as the tanks 2170*a* and 2170*b* rotate.

The turret liner machine system 2100 further includes a shell 2174, a skirt 2176, and a control panel 2178. The shell 2174 is attached to and extends below the table or platform surface 2118*a* and 2118*b* and is configured to protect the internal components of the turret liner machine system 2100. The skirt 2176 is attached to the shell 2174, extends below the shell 2174, and is also configured to protect the internal components of the turret liner machine system 2100. The skirt 2176 defines a plurality of holes 2180 that enable air to flow to the internal components of the turret liner machine system 2100 and enable the internal components to be air cooled. The control panel 2178 is attached to the shell 2174 and enables an operator to operate the turret liner machine system 2100.

Figure 22:
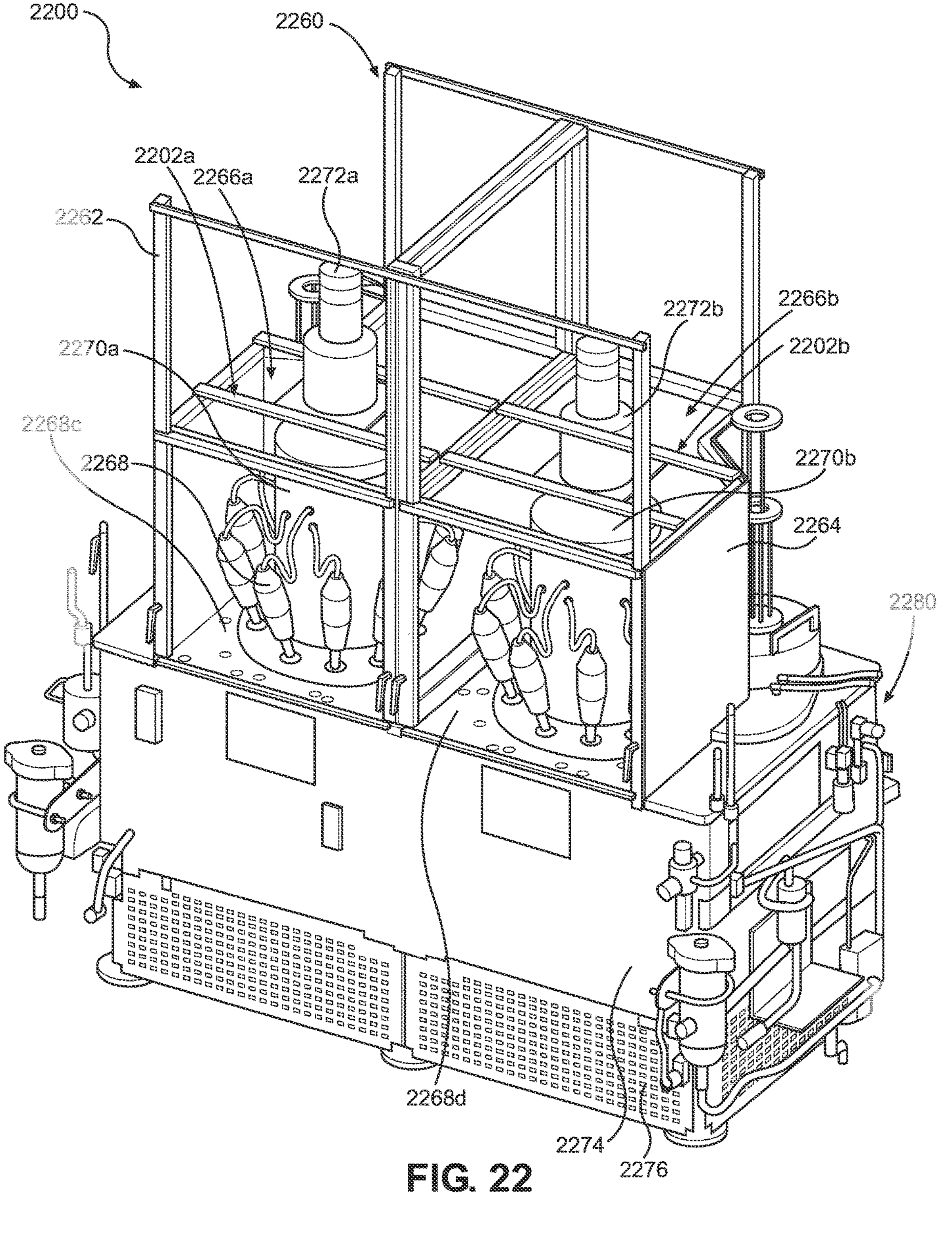
FIG. 22 illustrates an example of a turret liner machine system in accordance with aspects of the present disclosure.

FIG. 22 illustrates an example of a turret liner machine system 2200 in accordance with aspects of the present disclosure. Specifically, FIG. 22 is a perspective view of dual turret liner machine systems 100-2000 for applying a sealing compound to a can end or lid 490, 790, 1290, and

1790 and the turret liner machine system 2200 is illustrative of a super structure 2260 of dual turret liner machine systems 100-2000. The turret liner machine 2200 applies a sealant (not shown) to metal lids, each metal lid being received from a supply conveyor (not shown) and discharged to a discharge conveyor (not shown) via an exit chute (see, e.g., exit chute 2112*a* and 2112*b* shown in FIG. 21). In the illustrated embodiment, the dual turret liner machine 2200 includes two turret systems 2202*a* and 2202*b* driven by two main drive motors (not shown) or a single main drive motors (not shown) as described above. The main drive motor(s) are located proximate to the respective turret systems and may be configured to operate both turret systems 2202*a* and 2202*b*, increasing production time and increasing profits. In some implementations, the liner machine technology may incorporate any number of turrets, drives, motors, chucks, chuck drives, downstackers, and starwheels. The disclosed technology is aimed at performing high speed and high-volume end production with scalable systems.

The super structure 2260 includes a frame 2262, paneling 2264 attached to the frame 2262, a tank system 2266*a* and 2266*b* attached to each turret system 2202*a* and 2202*b*, and at least one door 2268 attached to the frame 2262. The super structure 2260 is attached to a table or platform surface 2218*a* and 2218*b* and is configured to support the tank systems 2266*a* and 2266*b* and protect operators and the turret systems 2202*a* and 2202*b* during use. Specifically, as described above, the turret systems 2202*a* and 2202*b* are configured to rotate at a high rate (i.e., 3,000 rpm) and the super structure 2260 is configured to prevent operators and/or other objects from interfering with that rotation. More specifically, the paneling 2264 and the door 2268 are configured to protect the turret systems 2202*a* and 2202*b* and the operators by preventing operators and/or other objects from interfering with rotation of the turret systems 2202*a* and 2202*b*. In the illustrated embodiment, the super structure 2260 includes four doors 2168*a*, 2168*b*, 2268*c* (shown in FIG. 22), and 2268*d* (shown in FIG. 22). The doors 2268 are configured to enable selective access to the turret systems 2202*a* and 2202*b* when the turret systems 2202*a* and 2202*b* are not operating.

The tank systems 2266*a* and 2266*b* each include a tank 2270*a* and 2270*b* and an attachment mechanism 2272*a* and 2272*b* attached to the tank 2270*a* and 2270*b*. The tanks 2270*a* and 2270*b* are each configured to contain a sealant solution that is applied to the can lids 490, 790, 1290, and 1790 by the turret systems 2202*a* and 2202*b*. Specifically, the tanks 2270*a* and 2270*b* are configured to channel the sealant solution to the nozzles 122-2022 described above for application to the can lids 490, 790, 1290, and 1790. The tanks 2270*a* and 2270*b* are each configured to rotate with their respective turret systems 2202*a* and 2202*b*, and the attachment mechanisms 2272*a* and 2272*b* are configured to attach the tanks 2270*a* and 2270*b* to the frame 2262 to structurally support the tanks 2270*a* and 2270*b*. The attachment mechanisms 2272*a* and 2272*b* remain stationary and are configured to support the tanks 2270*a* and 2270*b* as the tanks 2270*a* and 2270*b* rotate.

Figure 23:
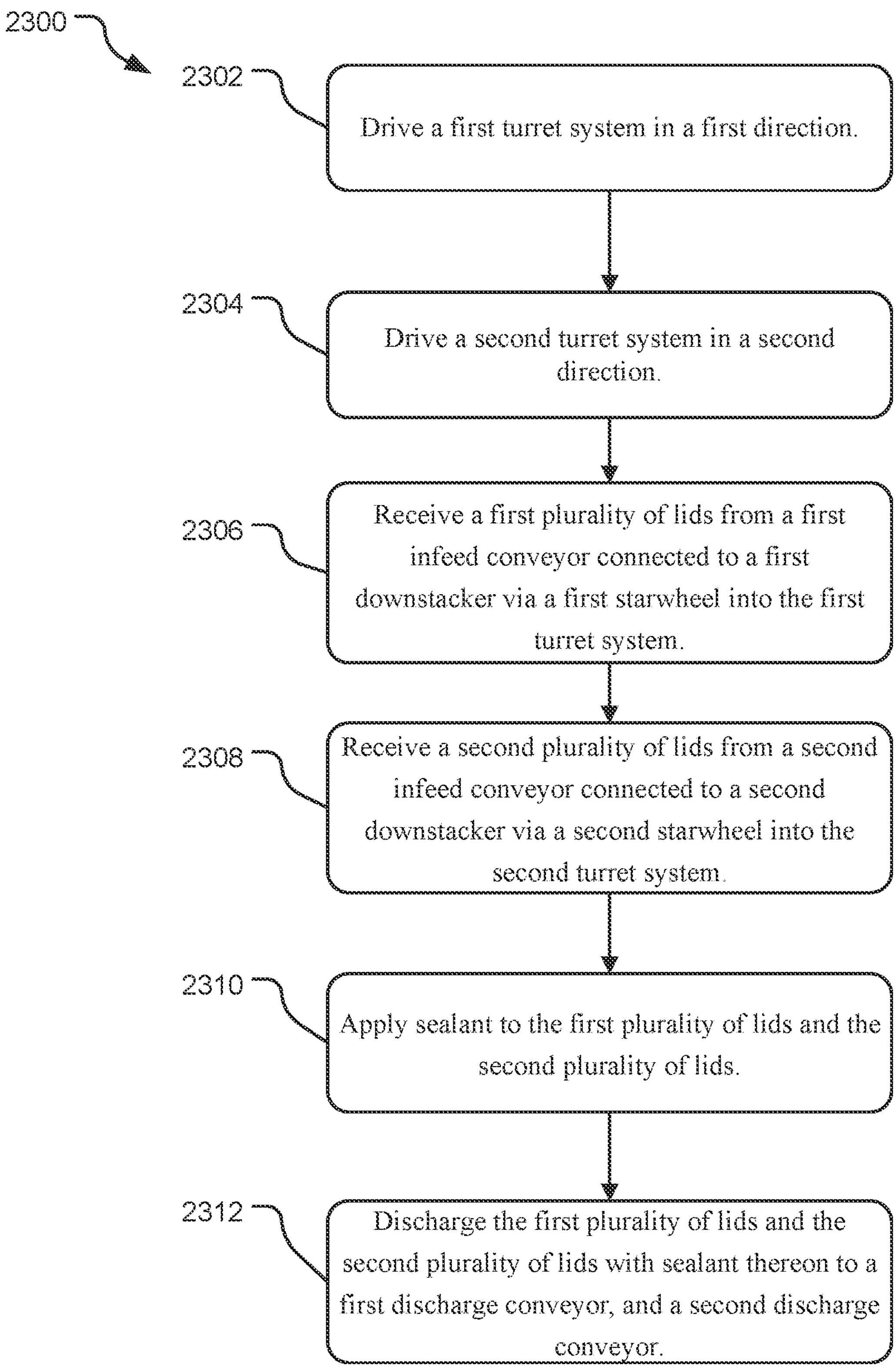
FIG. 23 is a flowchart of operations that support a dual turret liner machine system in accordance with aspects of the present disclosure.

The turret liner machine system 2200 further includes a shell 2274, a skirt 2276, and a control panel 2278. The shell 2274 is attached to and extends below the table or platform surface 2218*a* and 2218*b* and is configured to protect the internal components of the turret liner machine system 2200. The skirt 2276 is attached to the shell 2274, extends below the shell 2274, and is also configured to protect the internal components of the turret liner machine system 2200. The skirt 2276 defines a plurality of holes 2280 that enable air to flow to the internal components of the turret liner machine system 2200 and enable the internal components to be air cooled. The control panel 2278 is attached to the shell 2274 and enables an operator to operate the turret liner machine system 2200. FIG. 23 shows a flowchart of operations 2300 that support a dual turret liner machine system in accordance with aspects of the present disclosure. In some implementations, there may be one or three or more turrets in the liner machine system. In the implementation described in operations 2300, the dual turret system may be supported by one main drive. In other implementations supporting more turrets, it is contemplated that more than one main drive will be required. The turret liner machine systems disclosed herein are scalable.

An operation 2302 drives a first turret system in a first direction. An operation 2304 drives a second turret system in a second direction. The second turret system may rotate in a direction that is opposite from the direction of the first turret system. They are counter-rotating to each other.

An operation 2306 receives a first plurality of lids from a first infeed conveyor connected to a first downstacker via a first starwheel into the first turret system. The first starwheel may be rotating in a direction opposite to the direction of the rotation of the first turret system. Similarly, an operation 2308 receives a second plurality of lids from a second infeed conveyor connected to a second downstacker via a second starwheel into the second turret system. The second starwheel may be rotating in a direction opposite to the direction of the rotation of the second turret system. In some implementations, the first starwheel may rotate in a direction that is opposite to the second starwheel.

An operation 2310 applies sealant to the first plurality of lids and the second plurality of lids. In some implementations, sealant is applied at individual workstations located in the first turret system and in the second turret system via nozzles of applicators or sealing guns.

An operation 2312 discharges the first plurality of lids and the second plurality of lids with sealant thereon to a first discharge conveyor, and a second discharge conveyor, respectively.

In some implementations, the liner machine system includes at least one lower chuck drive. For example, there may be a first lower chuck drive connected to the first turret system and a second lower chuck drive connect to the second turret system. The first lower chuck drive may rotate in a direction that is opposite from the direction that the second lower chuck drives rotates.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In the appended figures, similar components or features may have the same reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A sealant liner apparatus comprising:

two motor driven turret systems, including a first turret system that rotates in a direction that is opposite a direction that a second turret system rotates;

two main drive motors to drive each of the two motor driven turret systems, wherein a first main drive motor is configured to drive the first turret system and a second main drive motor is configured to drive the second turret system;

a plurality of workstations located on each of the two motor driven turret systems spaced apart and extending outwardly from a circumference thereof, each workstation of the plurality of workstations adapted for receiving an individual can end;

two downstackers, each downstacker of the two downstackers located proximate to a turret system of the two motor driven turret systems to feed the individual can end to an individual workstation of the plurality of workstations and proximate to an exit chute that discharges the individual can end from the turret system of the two motor driven turret systems; and at least one sealant applicator mounted on each individual workstation of the plurality of workstations, the at least one sealant applicator electronically controlled to apply a sealant on the individual can end, wherein the exit chute comprises a first exit chute and the sealant liner apparatus further comprises a second exit chute, the first turret system configured to discharge the individual can end to the first exit chute and the second turret system configured to discharge the individual can end to the second exit chute, and wherein the first exit chute and the second exit chute are both positioned on a first side of the sealant liner apparatus and discharge the individual can end to the first side of the sealant liner apparatus to a single discharge conveyor.

2. The sealant liner apparatus of claim 1, wherein a starwheel adapted to receive the individual can end and feed the individual can end to a respective turret system of the two motor driven turret systems rotates in a direction that is opposite a direction that the respective turret system of the two motor driven turret systems rotates.

3. The sealant liner apparatus of claim 1, wherein a first starwheel rotates in a direction that is opposite a direction of a second starwheel.

4. The sealant liner apparatus of claim 1, wherein each downstacker of the two downstackers is located approximately +45° from a center axis of each turret system of the two motor driven turret systems.

5. The sealant liner apparatus of claim 1, further comprising:

a lift cam, wherein a length of the lift cam is approximately 150°.

6. The sealant liner apparatus of claim 5, wherein a first downstacker of the two downstackers is located proximate to the first exit chute, and the individual can end rotates around a turret system of the two motor driven turret systems in a clockwise direction.

7. The sealant liner apparatus of claim 5, wherein a second downstacker of the two downstackers is located proximate to the second exit chute, and the individual can end rotates around a turret system of the two motor driven turret systems in a counterclockwise direction.

8. The sealant liner apparatus of claim 1, further comprising:

two lower chuck drives, each lower chuck drive of the two lower chuck drives configured to each rotate in a direction that is opposite a direction that the other lower chuck drive of the two lower chuck drives rotates.

* * * * *